(12) United States Patent
Iwakawa et al.

(10) Patent No.: US 8,991,861 B1
(45) Date of Patent: Mar. 31, 2015

(54) ELECTRIC POSITION ADJUSTMENT APPARATUS FOR STEERING WHEEL

(71) Applicant: NSK Ltd., Shinagawa-ku, Tokyo (JP)

(72) Inventors: Masato Iwakawa, Maebashi (JP); Yoshiyuki Sekii, Maebashi (JP); Hiroshi Kakita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/125,178

(22) PCT Filed: May 22, 2013

(86) PCT No.: PCT/JP2013/064282
§ 371 (c)(1),
(2) Date: Dec. 10, 2013

(87) PCT Pub. No.: WO2013/176191
PCT Pub. Date: Nov. 28, 2013

(30) Foreign Application Priority Data

May 25, 2012 (JP) .................................. 2012-119918
May 28, 2012 (JP) .................................. 2012-120384
Jun. 26, 2012 (JP) .................................. 2012-143029

(51) Int. Cl.
*B62D 1/181* (2006.01)
*B62D 1/185* (2006.01)
*B62D 1/187* (2006.01)

(52) U.S. Cl.
CPC ................ *B62D 1/181* (2013.01); *B62D 1/187* (2013.01)
USPC .............................. 280/775; 74/493; 74/495

(58) Field of Classification Search
CPC .................. B62D 1/181; B62D 1/185
USPC ...................................... 280/775; 74/493, 495
See application file for complete search history.

(56) References Cited

U.S. PATENT DOCUMENTS 4,691,587 A * 9/1987 Farrand et al. .................. 74/493
4,893,518 A * 1/1990 Matsumoto et al. ............ 74/493
(Continued)

FOREIGN PATENT DOCUMENTS

DE 102 51 764 A1 5/2004
EP 1 486 395 A1 12/2004
(Continued)

OTHER PUBLICATIONS

International Search Report with English translation dated Aug. 6, 2013 (5 pages).

*Primary Examiner* — Ruth Ilan
*Assistant Examiner* — Laura Freedman
(74) *Attorney, Agent, or Firm* — Crowell & Moring LLP

(57) ABSTRACT

In order to make it possible to stably and smoothly perform the operation of position adjustment of a steering wheel 1, the electric position adjustment apparatus for a steering wheel of the present invention is such that: a concave engaging section 19a of a moving piece 16a that moves in the forward/backward direction with an electric motor 56 as a driving source has a cylindrical concave-shaped inner-circumferential surface; a cylindrical column section 65 of a transmission member 17a that transmits the movement of the moving piece 16a to a steering column 5b is inserted into the concave engaging section 19a by way of cylindrical spacer 72 and has a cylindrical convex-shaped outer-circumferential surface; and a cylindrical spacer 72 has a cylindrical convex-shaped outer-circumferential surface and a cylindrical concave-shaped inner-circumferential surface.

6 Claims, 24 Drawing Sheets

(56) References Cited

U.S. PATENT DOCUMENTS

| | | | |
|---|---|---|---|
| 4,900,059 A * | 2/1990 | Kinoshita et al. | 280/775 |
| 4,901,593 A * | 2/1990 | Ishikawa | 74/493 |
| 6,079,743 A * | 6/2000 | Grams | 280/775 |
| 6,637,771 B2 * | 10/2003 | Yoshimoto | 280/775 |
| 6,711,965 B2 * | 3/2004 | Tomaru et al. | 74/493 |
| 7,025,380 B2 * | 4/2006 | Arihara | 280/775 |
| 7,178,422 B2 * | 2/2007 | Armstrong et al. | 74/493 |
| 7,191,679 B2 * | 3/2007 | Tomaru et al. | 74/493 |
| 7,410,190 B2 * | 8/2008 | Sawada et al. | 280/777 |
| 7,444,900 B2 * | 11/2008 | Tomaru et al. | 74/495 |
| 7,886,630 B2 * | 2/2011 | Tomaru et al. | 74/493 |
| 8,146,945 B2 * | 4/2012 | Born et al. | 280/775 |
| 8,151,668 B2 * | 4/2012 | Oshita et al. | 74/495 |
| 8,448,986 B2 * | 5/2013 | Fevre et al. | 280/775 |
| 8,650,983 B2 * | 2/2014 | Mizuno et al. | 74/496 |
| 8,844,400 B2 * | 9/2014 | Morinaga | 74/495 |
| 8,899,622 B2 * | 12/2014 | Read et al. | 280/777 |
| 8,904,902 B2 * | 12/2014 | Lee et al. | 74/493 |
| 8,910,976 B2 * | 12/2014 | Toyoda et al. | 280/775 |
| 2004/0194570 A1 | 10/2004 | Tomaru et al. | |
| 2007/0137381 A1 * | 6/2007 | Arihara | 74/493 |
| 2008/0079253 A1 * | 4/2008 | Sekii et al. | 280/775 |
| 2008/0216597 A1 * | 9/2008 | Iwakawa et al. | 74/493 |
| 2009/0000417 A1 | 1/2009 | Oshita et al. | |
| 2009/0031844 A1 * | 2/2009 | Iwakawa et al. | 74/493 |
| 2011/0215560 A1 | 9/2011 | Born et al. | |

FOREIGN PATENT DOCUMENTS

| | | | | |
|---|---|---|---|---|
| EP | 1 980 470 A1 | 10/2008 | | |
| JP | 61-5263 U | 1/1986 | | |
| JP | 01111566 A * | 4/1989 | | B62D 1/18 |
| JP | 03178864 A * | 8/1991 | | B62D 1/18 |
| JP | 9-323658 A | 12/1997 | | |
| JP | 10-119793 A | 5/1998 | | |
| JP | 2005-255040 A | 9/2005 | | |
| JP | 2006-297989 A | 11/2006 | | |
| JP | 2009-6743 A | 1/2009 | | |
| JP | 2010-83392 A | 4/2010 | | |
| JP | 2010-116042 A | 5/2010 | | |
| JP | 5076908 B2 | 11/2012 | | |
| WO | WO 03/078234 A1 | 9/2003 | | |

* cited by examiner

ELECTRIC POSITION ADJUSTMENT APPARATUS FOR STEERING WHEEL

TECHNICAL FIELD

The present invention relates to an electric position adjustment apparatus for a steering wheel, and more specifically to an apparatus that is driven by an electric motor, and that adjusts the forward/backward position and up/down position of a steering wheel.

BACKGROUND ART

Various kinds of structure for electric position adjustment apparatuses for a steering wheel are known, and some are already being applied to steering apparatuses for automobiles. FIG. 21 illustrates a first example of conventional structure as disclosed in JP 2010-116042 (A). A steering shaft 2 to which a steering wheel 1 is fastened has a cylindrical shaped outer shaft 3, and a circular rod shaped inner shaft 4 that is inserted into the outer shaft 3 and is able to slide in the axial direction and transmit rotational force. More specifically, the inner circumferential surface from the middle section to the front-end section of the outer shaft 3 and the outer circumferential surface of the rear-end section of the inner shaft 4 are connected with spline engagement. The steering wheel 1 is fastened to the rear-end section of the outer shaft 3.

The steering shaft 2 is inserted into a cylindrical steering column 5, and is supported so as to be able to rotate freely. The steering column 5 has a cylindrical shaped outer column 6 that is supported by the vehicle body, and a cylindrical inner column 7 that is inserted into the outer column 6 so as to be able to slide in the axial direction. The rear end side portion of the middle section of the outer shaft 3 is supported on the inner side of the rear-end section of the inner column 7 such that displacement in the axial direction is prevented, and so as to be able to rotate freely. Moreover, the front end side portion of the middle section of the inner shaft 4 is supported on the inner side of the front-end section of the outer column 6 such that displacement in the axial direction is prevented, and so as to be able to rotate freely. With this structure, the steering shaft 2 is supported on the inside of the steering column 5 so as to be able to rotate freely, and the outer shaft 3 and inner column 7 are able to move in the forward/backward direction relative to the inner shaft 4 and outer column 6.

The apparatus of this first example of conventional structure is equipped with an electric actuator for making it possible to adjust the forward/backward position of the steering wheel 1 of a gear housing 8 that is fastened to the bottom surface of the outer column 6; a feed nut 9 that is supported on the inside of the gear housing 8 so that only rotation is possible with displacement in the axial direction prevented; a push-pull arm 10 that is fastened to the portion on the rear-end section of the inner column 7 that protrudes further toward the rear than the outer column 6; a push-pull rod 11 having a male screw section 12 provided on the front half section thereof that screws into the feed nut 9, and a rear-end section that is connected to the push-pull arm 10; and an electric motor (not illustrated in the figure) that is connected to the feed nut 9 by way of a worm reduction gear 13, and that rotates and drives the feed nut 9.

When adjusting the forward/backward position of the steering wheel 1, the feed nut 9 is rotated and the push-pull rod 11 is caused to displace in the axial direction. As the push-pull rod 11 displaces, the inner column 7 displaces in the same direction as the push-pull rod 11 by way of the push-pull arm 10, and by causing the outer shaft 3 that is supported on the inside of the inner column 7 to move in the forward/backward direction, the forward/backward position of the steering wheel 1 is adjusted.

In the electric position adjustment apparatus for a steering wheel of this first example of conventional construction, there is a possibility that the driver that is operating the steering wheel 1 will have a strange or uncomfortable feeling due to a small gap that exists in a joint section between the rear-end section of the outer column 6 and the front-end section of the inner column 7. In other words, in an electric position adjustment apparatus for a steering wheel, differing from a manual apparatus, the diameter of the rear-end section of the outer column 6 is not reduced even when maintaining the position of the steering wheel 1 after adjustment, so the small gap remains in the joint section. There is a possibility that the inner column 7 that supports the outer shaft 3 to which the steering wheel 1 is fastened may move or vibrate with respect to the outer column 6 that is supported by the vehicle body. There is also a possibility, that due to this movement, the support rigidity of the steering wheel 1 will decrease, giving the driver that operates the steering wheel 1 an uncomfortable feeling. Moreover, this backlash movement causes the resonant frequency of the portion of the electric position adjustment apparatus for a steering wheel that makes up the steering column apparatus that includes the steering shaft 2 and steering column 5 to become lower, and thus when there is minute vibration of the vehicle body such as when traveling over a rough road, there is a possibility that unpleasant noise or vibration will occur in this portion of the steering column apparatus.

FIG. 22 and FIG. 23 illustrate a second example of conventional structure as disclosed in JP 2006-297989 (A). In this second example of conventional structure as well, using construction similar to that of the first example of conventional structure, a steering shaft 2a is supported inside a steering column 5a so as to be able to rotate freely, and an outer shaft 3a and inner column 7a move in the forward and backward direction relative to an inner shaft 4a and outer column 6a.

In the apparatus of this second example of conventional structure, by using a linear motion ultrasonic motor 15 that is supported by the bottom end section of an installation bracket 14 as an electric actuator for making it possible to adjust the forward/backward position of the steering wheel 1, it is possible for the inner column 7a to displace in the axial direction with respect to the outer column 6a. More specifically, a moving piece 16 of the linear motion ultrasonic motor 15 is connected with the inner column 7a by a transmission member 17, and by transmitting the movement of the moving piece 16 to the inner column 7a, the inner column 7a is able to move in the forward/backward direction. The base end section of the transmission member 17 is linked with the moving piece 16 by way of a spherical joint 18. The spherical joint 18 has: a concave engaging section 19 that is formed in the moving piece 16; a spacer 20 that fits with and is supported by the concave engaging section 19, and that has an inner circumferential surface that is a spherical concave surface; a spherical engaging section 21 that is provided on the tip-end section of the transmission member 17, and has an outer circumferential surface that is a spherical convex surface that fits spherically with the inner circumferential surface of the spacer 20.

When adjusting the forward/backward position of the steering wheel 1, the linear motion ultrasonic motor 15 causes the moving piece 16 to displace in the axial direction of the steering column 5a. This displacement, by way of the transmission member 17, causes the inner column 7a to displace in the same direction as the moving piece 16, which causes the outer shaft 3a that is supported on the inside of the inner column 7a to displace in the forward/backward direction together with the inner column 7a. As a result, as illustrated by the two-dot chain line, it becomes possible to adjust the forward/backward position of the steering wheel 1.

In the case of this second example of conventional structure, there is a structural problem in that the manufacturing cost for maintaining smooth operation of the engaging section between the moving piece 16 and the transmission member 17 increases. In other words, in order to smoothly perform adjustment of the forward/backward position of the steering wheel 1 without backlash movement, it is necessary to adequately regulate the engagement strength of the engaging section between the spherical engaging section 21 of the transmission member 17 and the engaging section of the spacer 20. When this engagement strength is too low, there is a positive gap in the engaging section, so backlash movement occurs between the spherical engaging section 21 and spacer 20, and thus it becomes easy for backlash movement of the steering wheel 1 to occur in the forward/backward direction. On the other hand, when this engagement strength is too high, it becomes impossible for pivotal displacement of the spacer 20 with respect to the spherical engaging section 21 to be performed smoothly.

In this second example of conventional structure, the amount of movement of the moving piece 16 in the forward/backward direction is large, and unless there is a good degree of parallelism between the direction of movement of this moving piece 16 and the direction of movement of the inner column 7a during adjustment of the forward/backward position of the steering wheel 1, the transmission member 17 will displace in the axial direction of this transmission member 17 relative to the moving piece 16 due to the adjustment of the forward/backward position of the steering wheel 1. This relative movement causes rubbing in the axial direction of the transmission member 17 between the outer circumferential surface of the spacer 20 and the inner circumferential surface of the concave engaging section 19. When this occurs and the engagement strength is too high and pivotal displacement of the spacer 20 with respect to the spherical engaging section 21 is not performed smoothly, there will be strong rubbing between the outer circumferential surface of the spacer 20 and the inner circumferential surface of the concave engaging section 19, and there will be a possibility that strange noise or vibration will occur, causing the passengers to have an uncomfortable feeling. Particularly, in this state, the surface that allows relative displacement in the axial direction of the transmission member 17 between the transmission member 17 and the moving piece 16 is limited to one location on the outer circumferential surface of the spacer 20 and the inner circumferential surface of the concave engaging section 19, so it becomes easy for the rubbing length to become long, and thus it becomes even easier for strange noise or vibration to occur.

Highly precise processing of the inner circumferential surface of the spacer 20, which is a concave spherical surface, and the outer circumferential surface of the spherical engaging section 21, which is a convex spherical surface, in order to prevent the occurrence of this strange noise or vibration leads to a high cost. Moreover, even when the spherical engaging section 21 is accurately manufactured, it is impossible to avoid the outer diameter of the transmission member 17 from becoming small at the base end section of the spherical engaging section 21. Therefore it becomes easy for large stresses to occur in the neck section of the transmission member 17 during adjustment of forward/backward position of the steering wheel 1, and thus this kind of construction is disadvantageous from the aspect of maintaining sufficient durability during use over a long period of time.

As a structure for preventing the occurrence of strange noise or vibration in portions of the steering column apparatus, there is a mechanism such as illustrated in FIG. 24 and disclosed in JP 6,076,908 (B2) in which retaining holes 22 are formed in part in the axial direction of an outer column 6b, and by adjustment screws 24 that are screwed into female screws 23 that are formed in the retaining holes 22 pressing synthetic resin pads 26 so as to be in contact with the outer circumferential surface of an inner column 7b, backlash movement of portions of the steering column apparatus is prevented. However, in this mechanism, when the pressure force for pressing the pads 26 against the outer circumferential surface of the inner column 7b is made just large enough so that backlash movement can be prevented, the friction force when moving the outer column 6b and inner column 7b becomes large, so there is a problem in that the drive load on the motor, such as an electric motor, becomes large and the operating sound becomes large.

RELATED LITERATURE

Patent Literature

[Patent Literature 1] JP 2010416042 (A)
[Patent Literature 2] JP 2006-297989 (A)
[Patent Literature 3] JP 5,076,908 (B2)
[Patent Literature 4] JP H09-323658 (A)
[Patent Literature 5] JP H10-119793 (A)
[Patent Literature 6] JP 2005-255040 (A)
[Patent Literature 7] JP 2009-006743 (A)
[Patent Literature 8] JP 2010-116042 (A)
[Patent Literature 9] DE 10251764 (A1)

SUMMARY THE INVENTION

Problem to be Solved by the Invention

The object of the present invention is to provide at low cost construction of an electric position adjustment apparatus for a steering wheel that improves the rigidity of portions of a steering column apparatus, and enables stable and smooth operation of position adjustment for a steering wheel without causing the driver that operates the steering wheel to have a strange feeling.

Means for Solving the Problems

The electric position adjustment apparatus for a steering wheel of the present invention has:
a steering shaft, with a steering wheel being supported by and fastened to a rear-end section thereof;
a column unit that has: a support section that extends in an axial direction of the steering shaft, supports the steering shaft on an inside thereof so as to be able to freely rotate, is supported by a portion that is fastened to a vehicle body or a vehicle body side bracket that is supported by a portion that is fastened to the vehicle body and does not displace during position adjustment of the steering wheel; and an adjusted section that is supported by the support section so as to be able to displace in the axial direction of the steering shaft with at least part of the steering shaft during position adjustment of the steering wheel;

a moving piece that has a concave engaging section, and with an electric motor as a driving source, is able to displace in an axial direction of the column unit; and a transmission member that has a base-end section that is connected to and fastened to the adjusted section, and a tip-end section that engages with the concave engaging section of the moving piece by way of a spacer, and that is able to transmit movement of the moving piece to the adjusted section, Particularly, a feature of the electric position adjustment apparatus for a steering wheel of the present invention is that the concave engaging section of the moving piece has a cylindrical concave-shaped inner-circumferential surface whose inner diameter does not change in an axial direction of the transmission member; the tip-end section of the transmission member has a cylindrical convex-shaped outer-circumferential surface whose outer diameter does not change in the axial direction of the transmission member; the spacer has a cylindrical convex-shaped outer-circumferential surface whose outer diameter does not change in the axial direction of the transmission member and has a cylindrical concave-shaped inner-circumferential surface whose inner diameter does not change in the axial direction of the transmission member.

In the electric position adjustment apparatus for a steering wheel of the present invention, the mechanism for causing the moving piece to displace is not limited to an electric motor, however, in one aspect of the present invention, the electric position adjustment apparatus for a steering wheel comprises a forward/backward feed screw rod that, with displacement in the axial direction of the column unit prevented, is located parallel with the column unit and is able to rotate freely around a center axis of the forward/backward feed screw rod by way of the electric motor; wherein, the moving piece has a base section in which a screw hole is formed that screws onto the screw rod, and a tip-end section in which the concave engaging section is formed, and by rotating the forward/backward feed screw rod in a desired direction, the moving piece moves in an axial direction of the forward/backward feed screw rod.

Moreover, in one aspect of the present invention, the transmission member further has an outwardly protruding flange-shaped rim section provided in a middle section in the axial direction of the transmission member; an inner side spacer that is made of a hard material having an outer diameter that is smaller than an outer diameter of the rim section and that is located on a top surface of the rim section, and an outer side spacer that is made of a material having a vibration absorbing capability with a large internal loss and is located around the inner side spacer, are arranged so that a bottom surface of an inner side portion of the outer side spacer comes in contact with an outer diameter side portion of the top surface of the rim section, and a ring spacer that is made of a hard material and that has a wedge shaped cross-sectional shape is held between top surfaces of the inner side spacer and the outer side spacer and the outer circumferential surface of the adjusted section.

In one aspect of the present invention, the electric position adjustment apparatus for a steering wheel further has an intermediate shaft that is linked with a front-end section of the steering shaft by way of a universal joint such that torque can be transmitted; wherein the steering shaft has integrated construction in which an entire length thereof does not extend or contract; the adjusted section is composed of a steering column having integrated construction in which an entire length thereof does not extend or contract; the intermediate shaft has construction in which an entire length thereof can extend or contract; and by extending or contracting the intermediate shaft, the whole steering shaft and the steering column are able to displace.

However, the present invention is not limited to this aspect, and, for example, the present invention can also be applied to construction in which the steering shaft is composed of an outer shaft, and an inner shaft that corresponds to part of the steering shaft and that is inserted into the outer shaft so as to be able to slide in the axial direction of the steering shaft, and so as to be able to transmit rotational force; the column unit is such that the support section is composed of an outer column, and the adjusted section is composed of an inner column that is inserted into the outer column so as to be able to slide in the axial direction of the column unit; and when adjusting the position of the steering wheel, the inner column and the outer shaft are displaced in the axial direction of the steering shaft with respect to the outer column and the inner shaft.

In one aspect of the present invention, preferably a mechanism is provided at at least one location, and preferably at least two locations, in an axial direction of the support section which is located on an opposite side in a radial direction of the transmission member, and presses the adjusted section in a direction toward the transmission member.

Moreover, the adjusted section is preferably composed of a middle cylindrical section that is located in a middle section in an axial direction of the adjusted section and whose outer diameter does not change in the axial direction of the adjusted section, and reduced-diameter sections that are located on both end sides in the axial direction of the middle cylindrical section and whose outer diameters are smaller than an outer diameter of the middle cylindrical section.

In this case, preferably, the base-end section of the transmission member is connected and fastened to the middle cylindrical section, and mechanisms are provided at two locations in the axial direction of the support section which is located on the opposite side in the radial direction of the transmission member, which press the middle cylindrical section in the direction toward the transmission member. These mechanisms are provided such that, regardless of displacement in the axial direction of the adjusted section with respect to the support section, the mechanisms do not separate from the middle cylindrical section.

In the case where mechanisms that press the adjusted section toward the transmission member are provided at two locations in the axial direction of the support section, it is further preferred that the space in the axial direction between these mechanisms be essentially equal to the maximum range of movement of the adjusted section in the axial direction of the column unit.

Preferably, a pair of pre-loaded angular ball bearings having back-to-back contact angles are placed between the inner circumferential surface of the reduced-diameter section of the adjusted section and the outer circumferential surface of at least part of the steering shaft, and the steering shaft is supported by the adjusted section so as to be able to rotate freely, and so that displacement in the axial direction with respect to the adjusted section is prevented.

It is possible to employ construction in which each mechanism that presses the adjusted section downward has a retaining hole that is formed so as to connect the inner circumferential surface and outer circumferential surface of the support section, with a sliding plate, an elastic member and a cover being assembled in the retaining hole in order from the inside in the radial direction of the support section, where the elastic member is elastically compressed between the sliding plate and the cover, and the sliding plate presses the outer circumferential surface of the adjusted section.

Effect of the Invention

With the present invention, an electric position adjustment apparatus for a steering wheel that is able to stably and smoothly perform the operation of adjusting the position of the steering wheel is achieved at low cost.

First, cost reduction is achieved by simplifying the shape of a transmission member and spacer that transmit movement of a moving piece to an adjusted section of a column unit. In other words, the shapes of the portions where the transmission member and the spacer engage are simple cylindrical surfaces, so these members can be manufactured with high precision and at low cost by cold plastic working such as cold forging.

Moreover, relative displacement of the transmission member and moving piece in the axial direction of the transmission member is compensated for in at two locations; between the inner circumferential surface of the spacer and the outer circumferential surface of the tip-end section of the transmission member, and the outer circumferential surface of the spacer and the inner circumferential surface of the concave engaging section that is provided in the moving piece. In other words, when the direction of movement of the moving piece and the direction of movement of the adjusted section of the column unit due to forward/backward position adjustment of the steering wheel are non-parallel due to these members rubbing at two locations, and when there is relative displacement in the axial direction of the transmission member of the transmission member and moving piece due to this forward/backward position adjustment, the length of rubbing in these rubbing areas can be shortened, so the occurrence of strange noise and vibration is suppressed.

MODES FOR CARRYING OUT THE INVENTION

First Example

Figure 21:
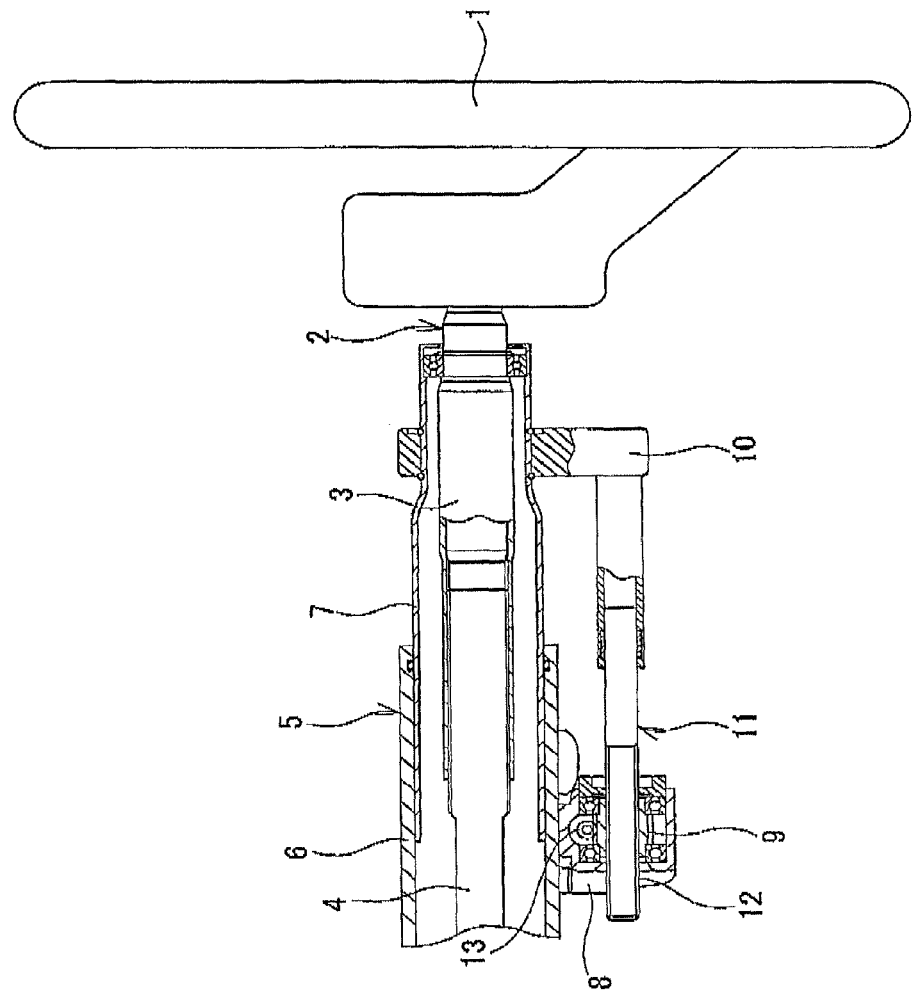
FIG. 21 is a partial vertical section side view illustrating a first example of conventional structure.
Figure 22:
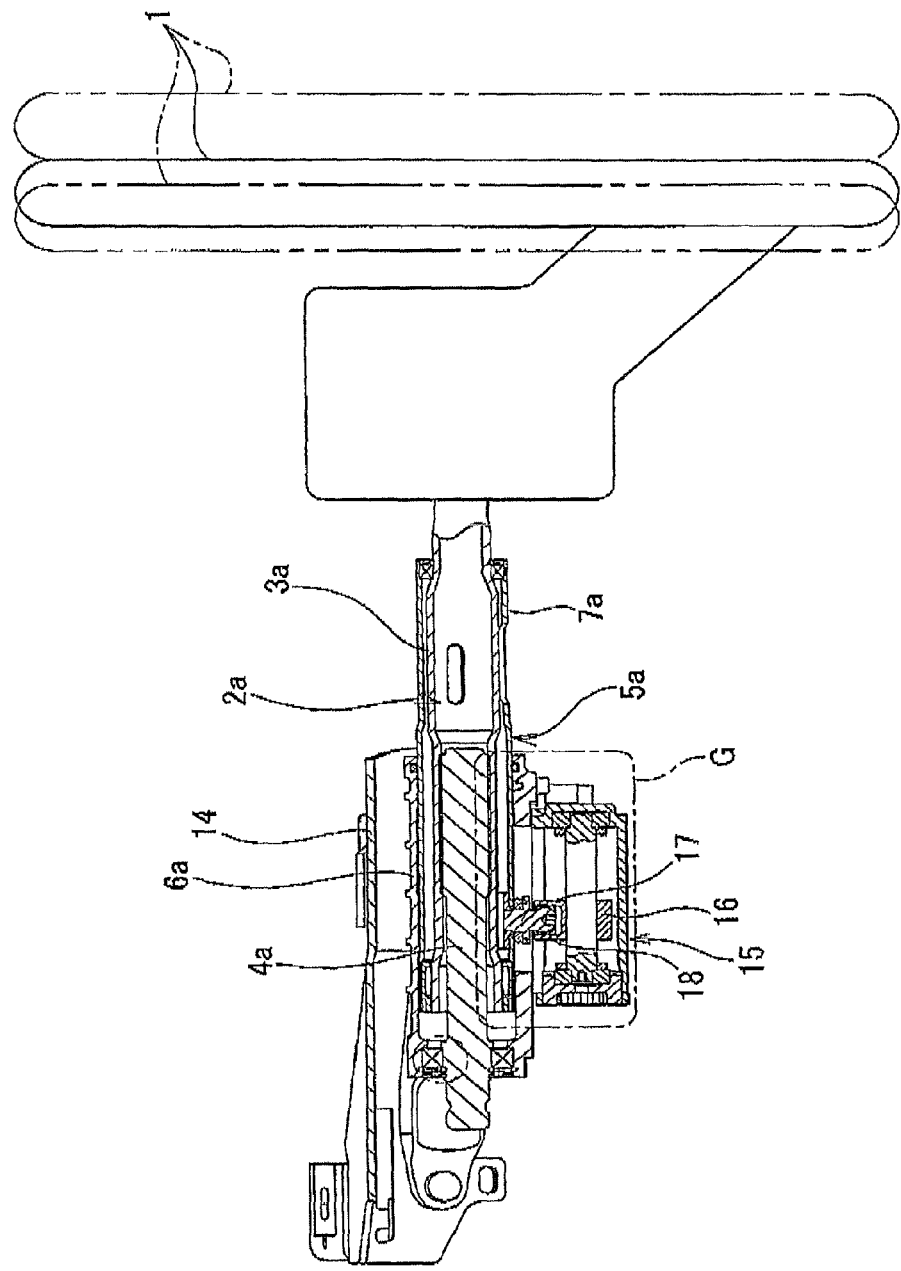
FIG. 22 is a vertical section side view illustrating a second example of conventional structure.
Figure 23:
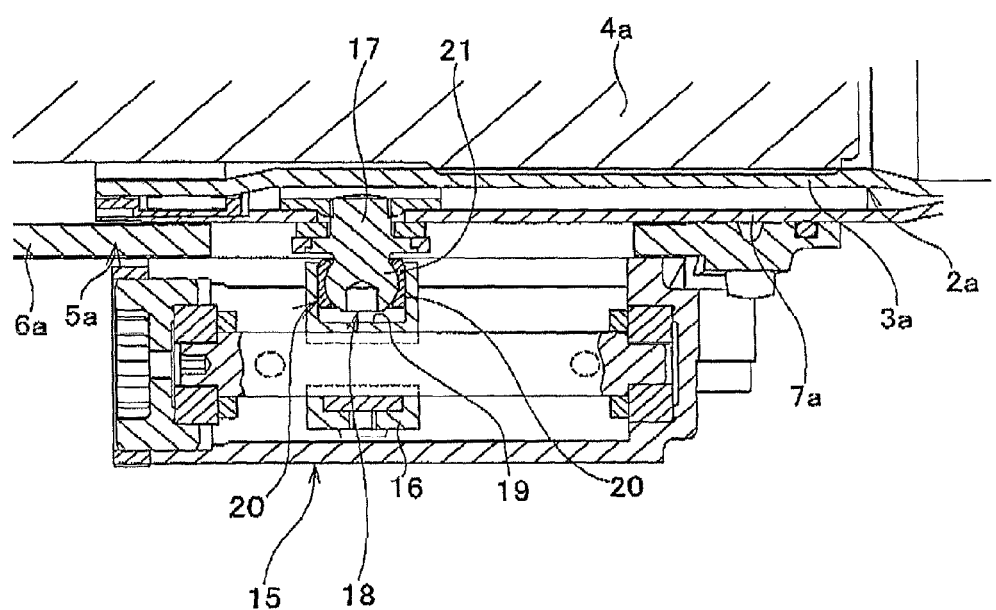
FIG. 23 is an enlarged view of area G in FIG. 22.
Figure 24:
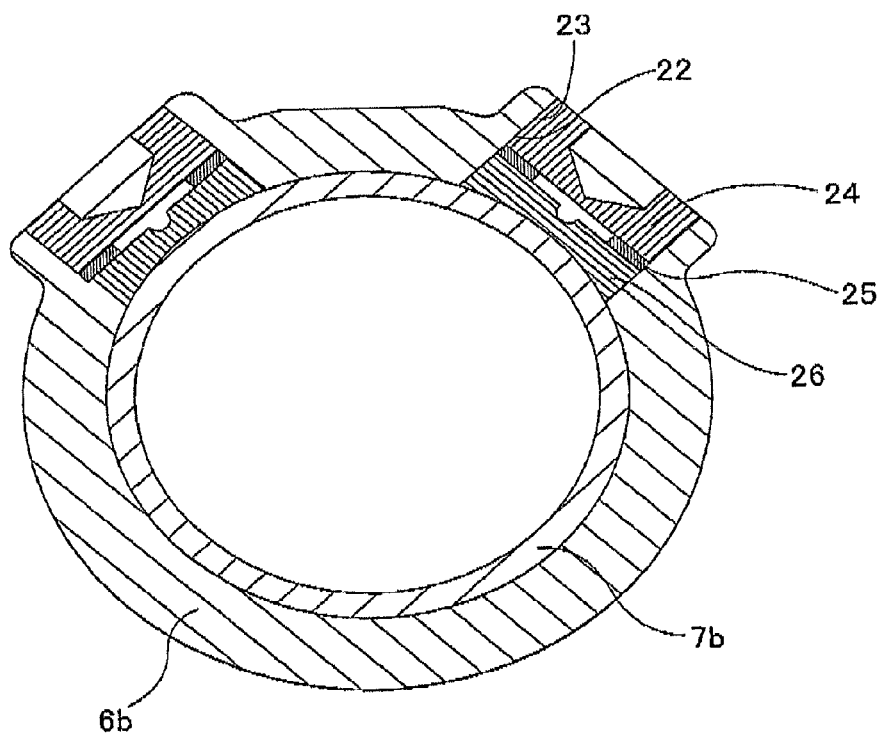
FIG. 24 is a partial cross-sectional view illustrating a conventional gap adjustment mechanism for adjusting a gap between an outer column and an inner column that can be applied to the first and second example of conventional structure.

FIG. 1 to FIG. 18 illustrate a first example of an embodiment of the present invention. The electric position adjustment apparatus for a steering wheel has a steering shaft 2b and a cylindrical steering column 5b, neither of which is extendable or contractible, in the portion that makes up a steering column apparatus. In the construction of this example, the forward/backward position and the up/down position of a steering wheel 1 that is supported by and fastened to the rear-end section of the steering shaft 2b that protrudes from an opening on the rear end of the steering column 5b (see FIG. 21) can be adjusted within specified ranges, wherein, adjustment of the forward/backward position of the steering wheel 1 is achieved by moving the entire steering shaft 2b and steering column 5b in the axial direction. Therefore, in this example, the entire steering column 5b corresponds to an adjusted section of a column unit of the present invention.

In the construction of this example, in order for the steering shaft 2b to be able to move in the axial direction (forward/backward direction) without the overall length thereof extending or contracting, construction is applied that makes it possible to transmit torque and makes it possible for the entire length to extend and contract by using an intermediate shaft 28, which is formed by joining an intermediate inner shaft 29 and an intermediate outer shaft 30 together using a spline engagement, that is connected to the front-end section of the steering shaft 2b so as to be able to transmit torque by way of a universal joint 27a as illustrated in FIG. 1 to FIG. 6. In other words, the movement in the forward/backward direction of the steering shaft 2b is compensated for by the extension or contraction of the intermediate shaft 28. The front-end section of the intermediate shaft 28 is linked to the input shaft (not illustrated in the figure) of a steering gear unit for applying a steering angle to the steered wheels (front wheels) by way of another universal joint 27b.

Figure 3:
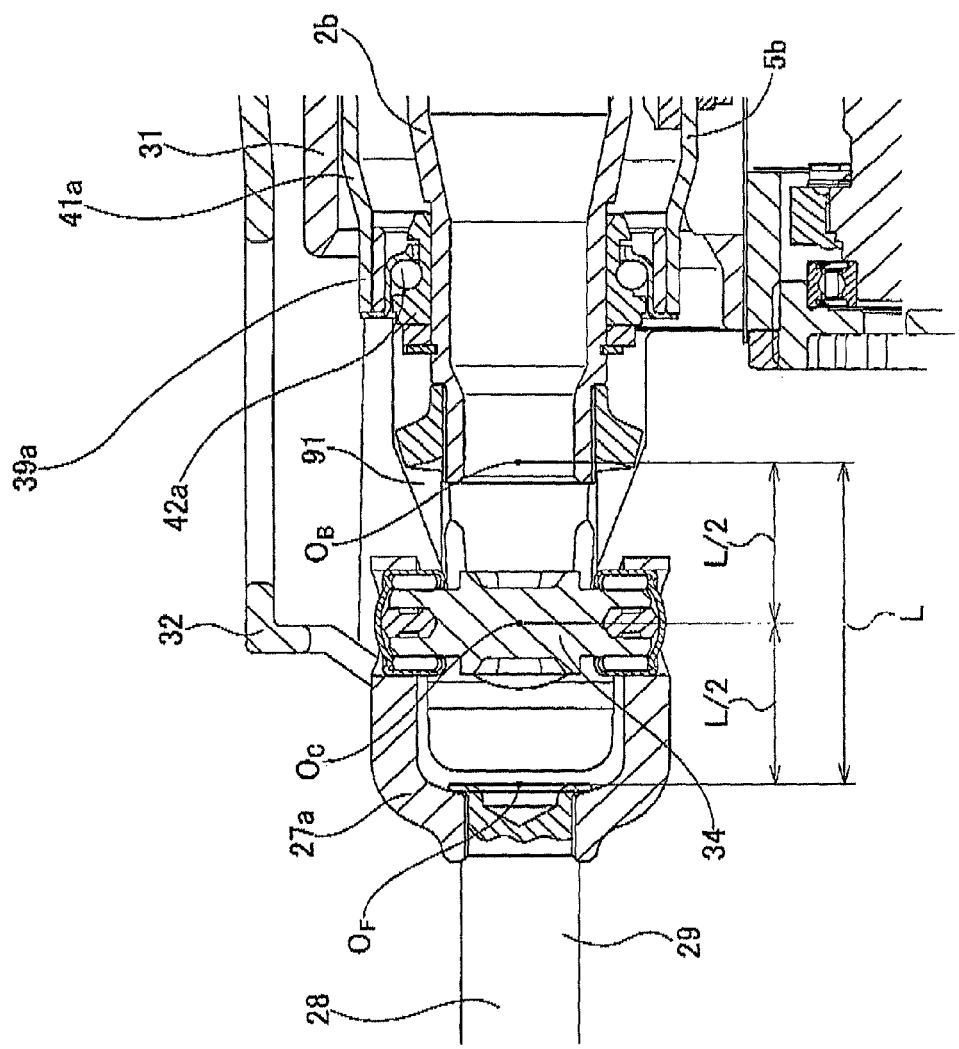
FIG. 3 is an enlarged view of area A in FIG. 2.

Moreover, in the construction of this example, in order that position adjustment of the steering wheel 1 can be performed smoothly, the installation location of the universal joint 27a that links the front-end section of the steering shaft 2b and the rear-end section of the intermediate shaft 28 is appropriately regulated, and the amount of relative displacement between the steering shaft 2b and the intermediate shaft 28 during position adjustment of the steering wheel 1 is kept small. More specifically, in order to support a column holder 31 that holds the steering column 5b so as to be able to pivotally displace with respect to a vehicle body side bracket 32, a pair of left and right tilt shafts 33 that are concentric with each other (see FIG. 9 and FIG. 11) and the steering shaft 2b are arranged at positions where the respective center lines of each cross each other. Furthermore, as illustrated in FIG. 3, the center line $O_C$ of the pair of tilt shafts 33 is located in the middle position in the forward/backward direction between the center position $O_F$ of displacement on the front-end side and the center position of displacement $O_B$ of displacement on the rear-end side of the universal joint 27a.

The center position $O_F$ of displacement on the front side is the center position of displacement of the universal joint 27a in the state where the steering wheel 1 has been displaced to the front-end position of the adjustable range, or in other words, is the center point position of the joint spider 34 of the universal joint 27a in this state. Moreover, the center position $O_B$ of displacement on the rear-end side is the center position of displacement of the universal joint 27a in a state where the steering wheel 1 has been displaced to the rear-end position of the adjustable range. In this example, the center line $O_C$ of the pair of tilt shafts 33 is located in the middle position of a connecting line segment that connects the center position $O_F$ of displacement on the front-end side and the center position $O_B$ of displacement on the rear-end side. Therefore, when the length of the connecting line segment that connects the center position $O_F$ of displacement on the front-end side and the center position $O_B$ of displacement on the rear-end side is taken to be L, the distances from the center line $O_C$ of the pair of tilt shafts 33 to the center position $O_F$ of displacement on the front-end side and the center position $O_B$ of displacement on the rear-end side are both L/2. Even when the center line $O_C$ of the pair of tilt shafts 33 shifts forward or backward ±L/10 or more preferably ±L/20 from the position illustrated in the figure, the center line $O_C$ of the pair of tilt shafts 33 is still located in nearly the middle position in the forward/backward direction between the center position $O_F$ of displacement on the front-end side and the center position $O_B$ of displacement on the rear-end side, so no particular trouble occurs.

Figure 4:
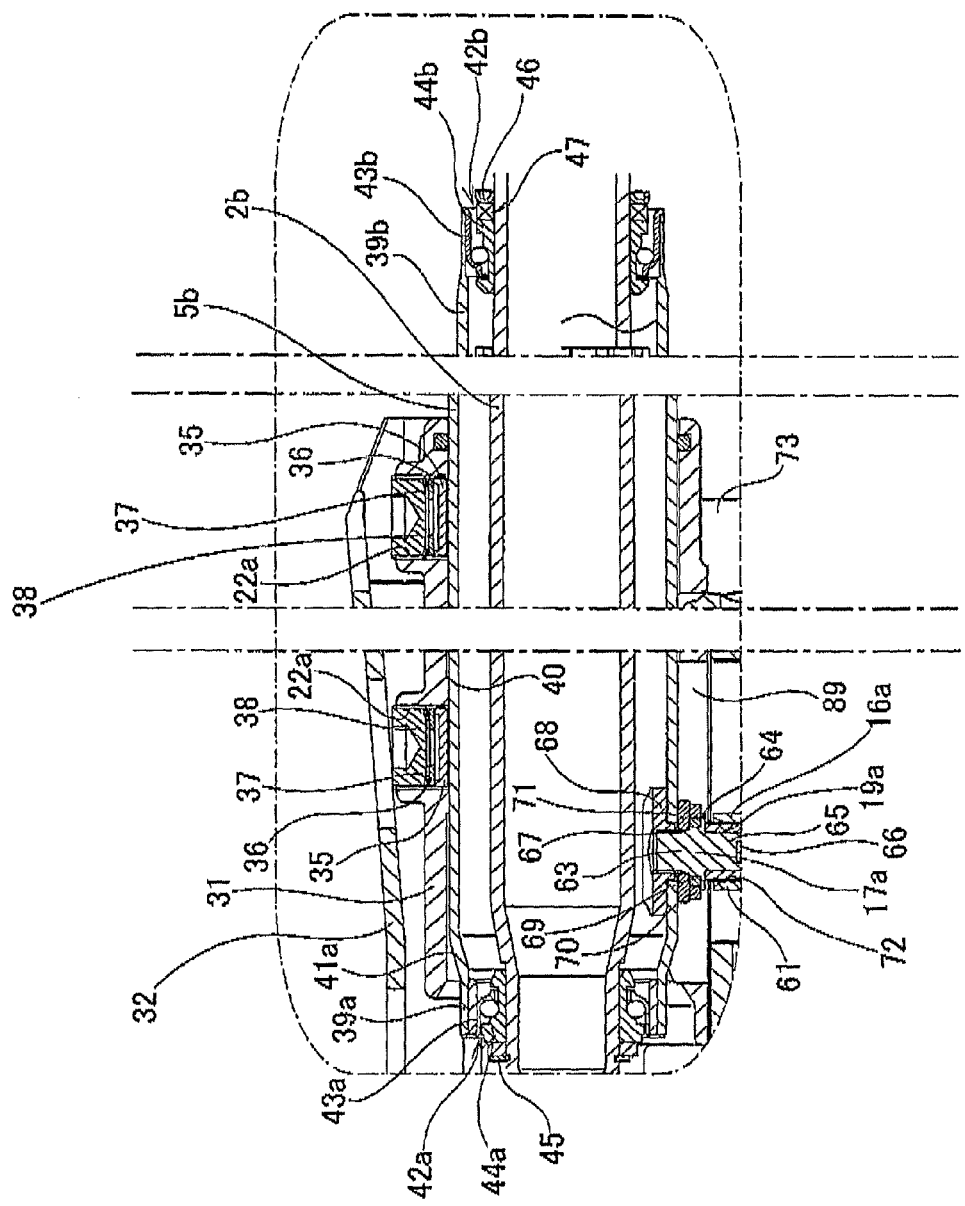
FIG. 4 is an enlarged view of area B in FIG. 2.
Figure 14:
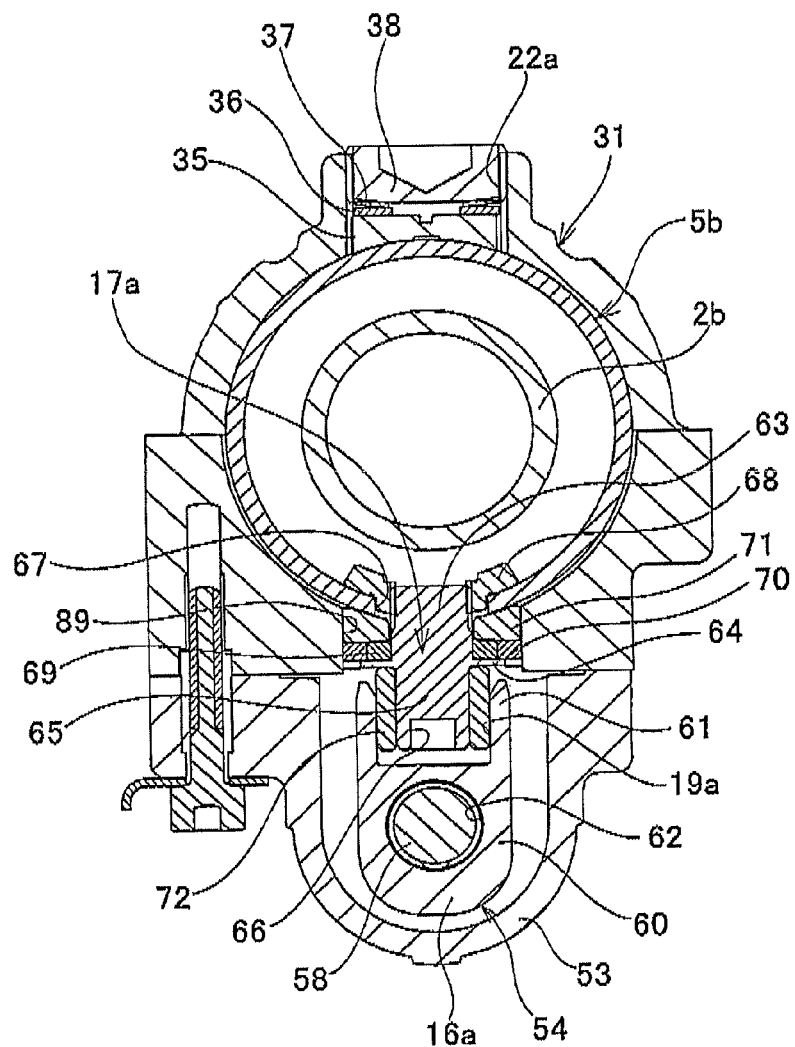
FIG. 14 is an enlarged cross-sectional view of section D-D in FIG. 2.

The column holder 31 that holds the steering column 5b such that displacement in the axial direction (forward/backward direction) is possible is formed into a cylindrical shape, and more specifically, is formed into a circular cylindrical shape by die casting of a light alloy, for example. The column holder 31 corresponds to the support section of the column unit of the present invention. In order to eliminate the backlash movement of the steering column 5b with respect to the column holder 31, retaining holes 22a are formed at two locations on the top surface of the column holder 31 that are separated in the forward/backward direction, and are formed so as to connect the inner circumferential surface and outer circumferential surface of the column holder 31. As illustrated in FIG. 4 and FIG. 14, a sliding plate 35, a washer 36, a disc spring 37 are located on the inside of each retaining hole 22a, and the opening on the top end of the retaining hole 22a is covered by a screw cap 38. The sliding plate 35 is made of a high polymer material having excellent sliding properties such as synthetic resin like polyacetal (POM), synthetic rubber or the like. In this state, the sliding plates 35 that are located in the end sections on the inner side of the retaining holes 22a are pressed by the elastic force of the disc springs 37 against the outer circumferential surface (top surface) of the steering column 5b so that there is no backlash movement of the steering column 5b on the inside of the column holder 31. The spacing in the axial direction between these mechanisms for preventing backlash movement of the steering column 5b is arbitrary, however, in this example, the spacing in the axial direction is practically equal to the maximum movable range in the axial direction of the steering unit.

In this example, from the aspect of maintaining the necessary rigidity, the steering column 5b is integrally formed into a cylindrical shape using extruded tube or electro-resistance-welded tube made of aluminum alloy, iron alloy, and the like. However, it is also possible to use combined construction in which plural elements are welded or joined together. In this example, the steering column 6b has a substantially cylindrical shape; however, the shape is not limited to this. By performing a drawing process on both end sections in the forward/backward direction of the steering column 5b, reduced-diameter sections 39a, 39b having an outer diameter that is less than the outer diameter of the middle section in the forward/backward direction are formed. Moreover, the middle section in the forward/backward direction of the steering column 5b is a middle cylindrical section 40 whose outer diameter does not change in the axial direction, and both end sections in the forward/backward direction of the middle cylindrical section 40 are connected to the reduced-diameter sections 39a, 39b by inclined surface sections 41a, 41b. The length in the axial direction of the middle cylindrical section 40 and the installation positions of the retaining holes 22a are regulated by the relationship with the amount of adjustment in the forward/backward direction of the steering wheel 1, and is such that the sliding plates 35 are not separated from the middle cylindrical section 40 regardless of the position in the axial direction of the steering column 5b with respect to the column holder 31.

The steering shaft 2b is integrally formed into a cylindrical shape or circular rod shape using extruded tube or electro-resistance-welded tube made of an iron alloy, or using extruded tube or drawn pipe that is made of aluminum alloy, however, as in the case of the steering column 5b, it is also possible to use combined construction of plural elements that are welded or joined. The steering shaft 2b is supported by a pair of ball bearings 42a, 42b that are arranged at both end sections in the forward/backward direction such that displacement in the axial direction with respect to the steering column 5b is prevented, and so as to be able to rotate freely.

The pair of ball bearings 42a, 42b are both angular ball bearings having back-to-back contact angles, and in a preloaded state, are located between the inner circumferential surface of the reduced-diameter sections 39a, 39b and the outer circumferential surface of the portions near both ends of the middle section of the steering shaft 2b. Therefore, in this example, as illustrated in FIG. 4, the outer rings 43a, 43b of the pair of ball bearings 42a, 42b are fixed into the opening edge sections of the reduced-diameter sections 39a, 39b, and are prevented from displacement in a direction toward each other. Moreover, the inner ring 44a of the ball bearing 42a on the front side is fastened onto the front end side portion of the middle section of the steering shaft 2b by a retaining ring 45 that is fixed to the steering shaft 2b such that displacement in the forward direction is prevented. On the other hand, the inner ring 44b of the ball bearing 42b on the rear side is fastened onto the steering shaft 2b with a loose fit using a push nut 46 such that displacement in the backward direction is prevented. An elastic material 47 such as a disc spring is held between the surface on the front side of the push nut 46 and the surface on the rear end of the inner ring 44b, and this elastic material 47 applies an elastic force in the forward direction to the inner ring 44b. With the construction described above, the steering shaft 2b is supported on the inner side of the steering column 5b such that displacement in the axial direction is prevented, there is no backlash movement, and so as to be able to rotate freely.

In this example, instead of deep-groove ball bearings, back-to-back combined angular ball bearings are used as the pair of ball bearings 42a, 42b, and are arranged so as to be preloaded in the axial direction of the steering shaft 2b. Therefore, by preloading, it is possible to prevent backlash in the bearings, and it is possible to reduce the rotary torque of the bearings, so a steering apparatus having good steering stability of the steering wheel 1 is achieved. Moreover, a push nut 46 is used for fastening the inner ring 44 on the rear side, so it is not necessary to form a retaining groove on the rear-end section of the steering shaft 2b to which large stress from the steering wheel 1 can be easily applied. Therefore, it is possible to maintain the strength and rigidity of the rear-end section of the steering shaft 2b without increasing the thickness of the steering shaft 2b. Furthermore, a screw hole 48 is provided on the rear-end section of the steering shaft 2b, and by supporting and fastening the steering wheel 1 using this screw hole 48, the diameter of the rear-end section of the steering shaft 2b is sufficiently maintained.

Figure 9:
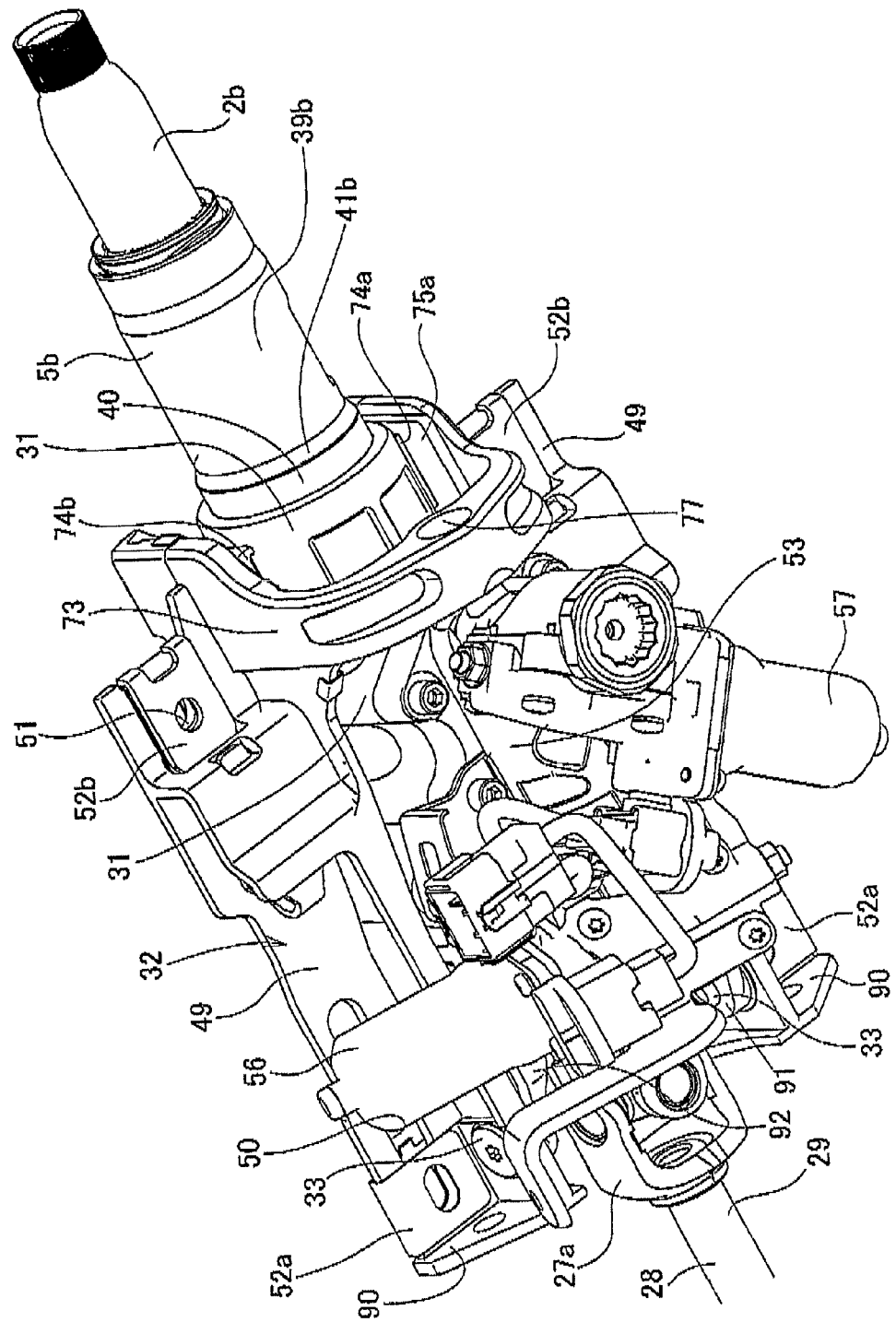
FIG. 9 is a perspective view illustrating the state of the right half of FIG. 6 as seen from underneath.
Figure 11:
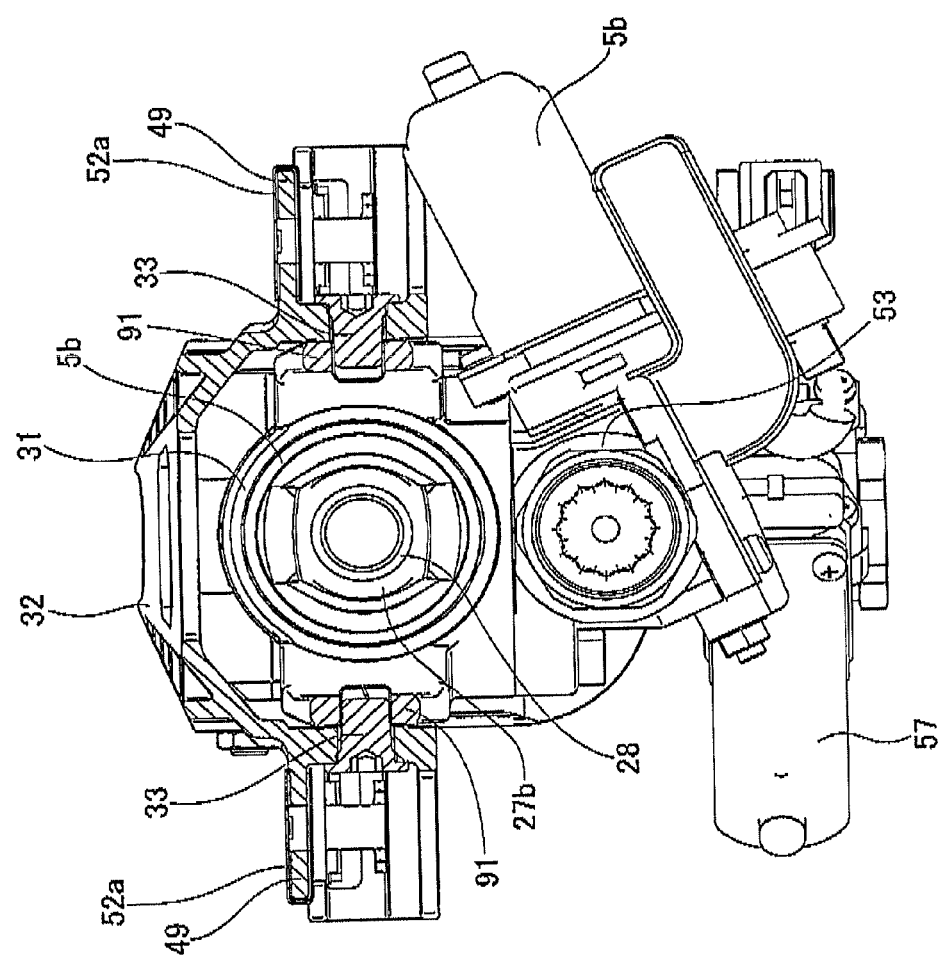
FIG. 11 is a partial cross-sectional view illustrating the state as seen from the left in FIG. 1.
Figure 12:
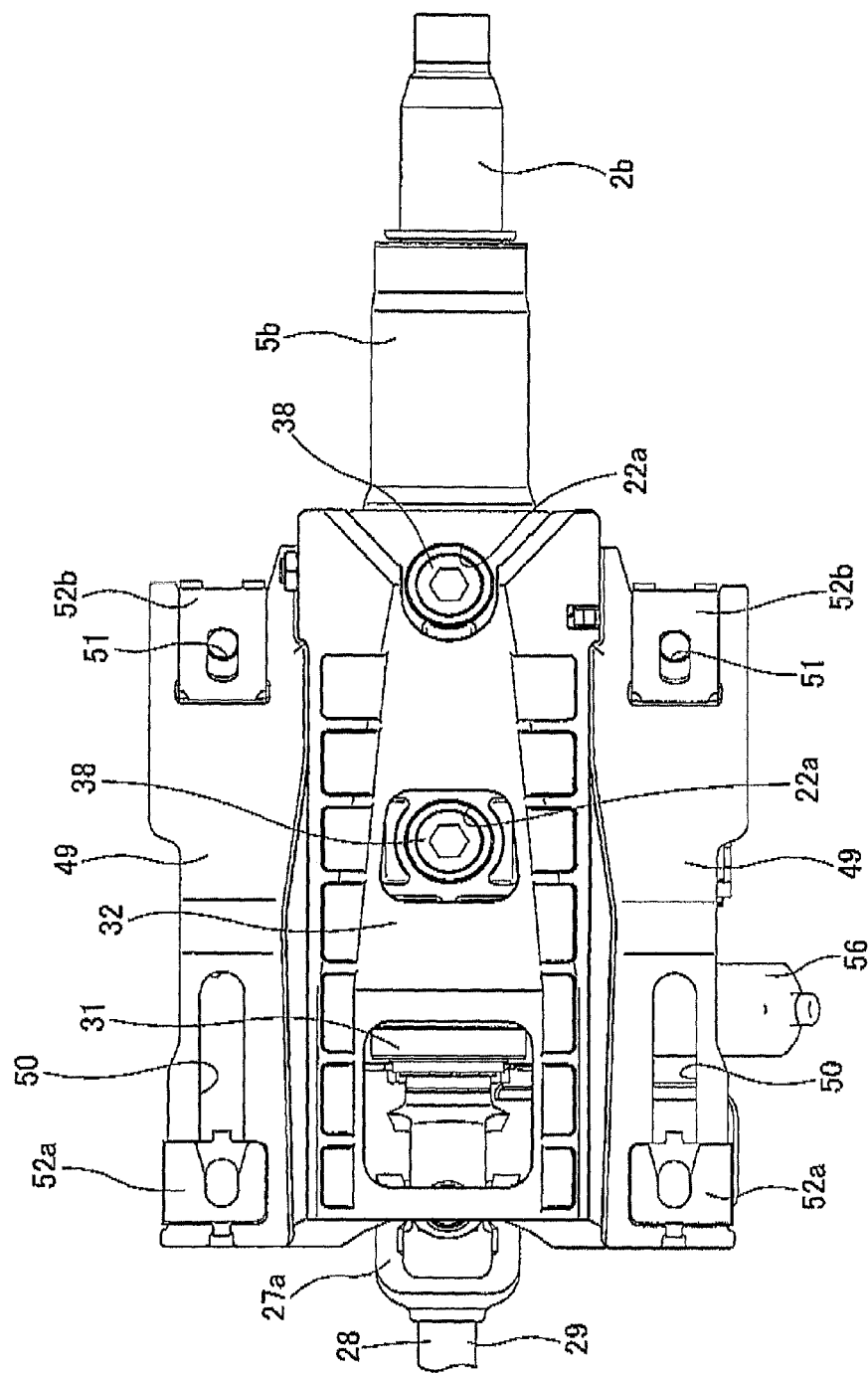
FIG. 12 is a top view illustrating the state as seen from above in FIG. 2.
Figure 13:
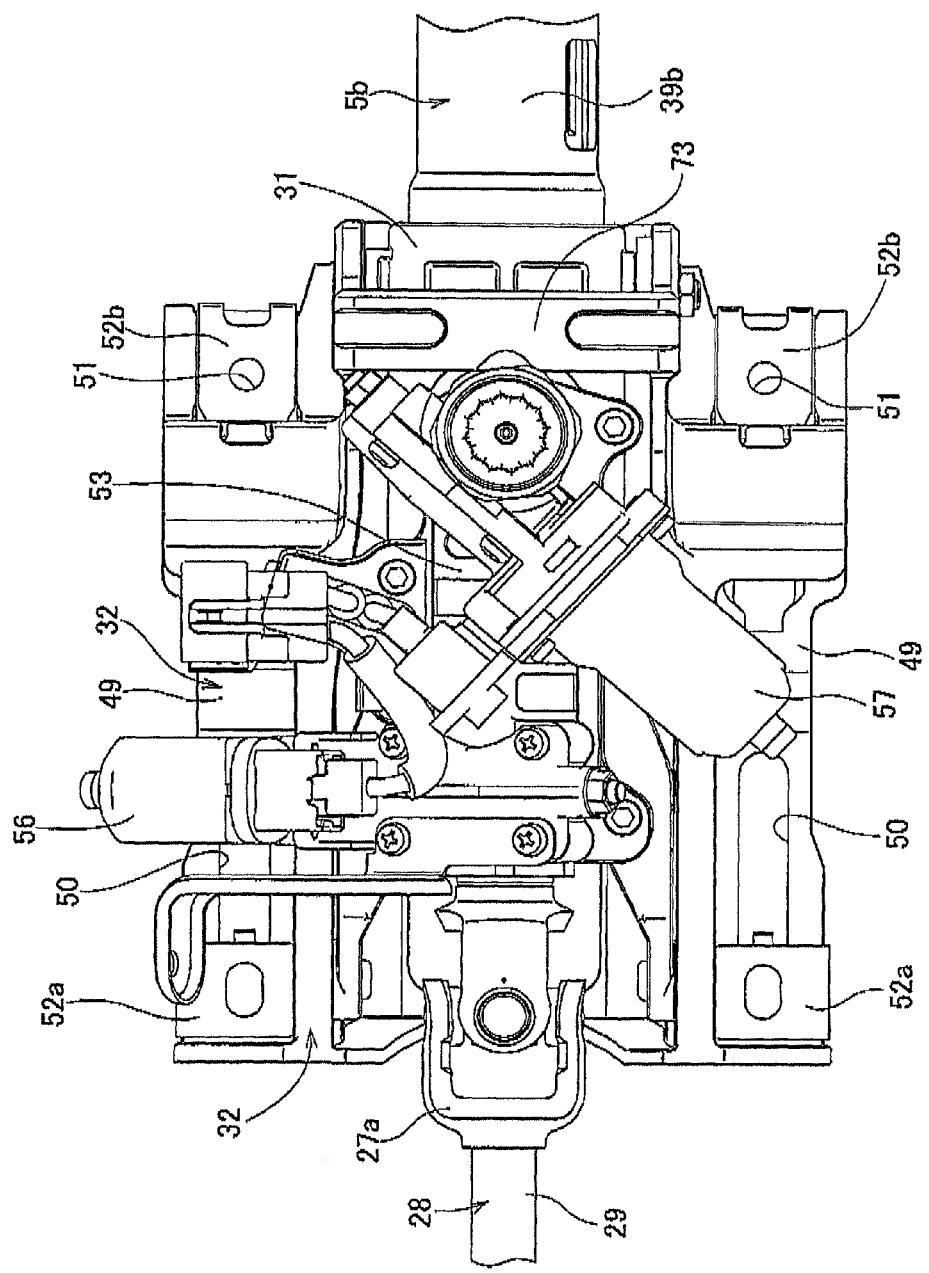
FIG. 13 is a bottom view illustrating the state as seen from underneath in FIG. 2.

As illustrated in FIG. 9 and FIG. 11, the column holder 31 is supported with respect to a vehicle body side bracket 32 by a pair of tilt shafts 33 that are provided on both sides of the front-end section of the column holder 31 so as to be concentric with each other, and so that the column holder 31 is able to pivotally displace around these tilt shafts 33 as a center. The vehicle body side bracket 32 is integrally formed by die casting of a light alloy, for example, and is supported by a portion that is fastened to the vehicle body so as to be able to displace in the forward direction due to an impact load that is applied during a secondary collision. To accomplish this, a pair of left and right installation plate sections 49 are provided on the vehicle body side bracket 32; a long hole 50 that extends in the forward/backward direction is formed in the front section of each of these installation plate sections 49; and a notch 51 that is open on the rear-end edge of the installation plate section 49 is formed on the rear-end sections. Sliding plates 52a, 52b are fixed in the long holes 50 and notches 51, and the pair of installation plate sections 49 are supported by a portion that is fastened to the vehicle body by bolts or studs that are inserted into through holes in these sliding plates 52a, 52b. In this state, the vehicle body side bracket 32 is normally securely fastened, however, when a large impact load is applied in the forward direction during a secondary collision, the bolts or studs displace within a displaceable range inside the long holes 50.

Figure 1:
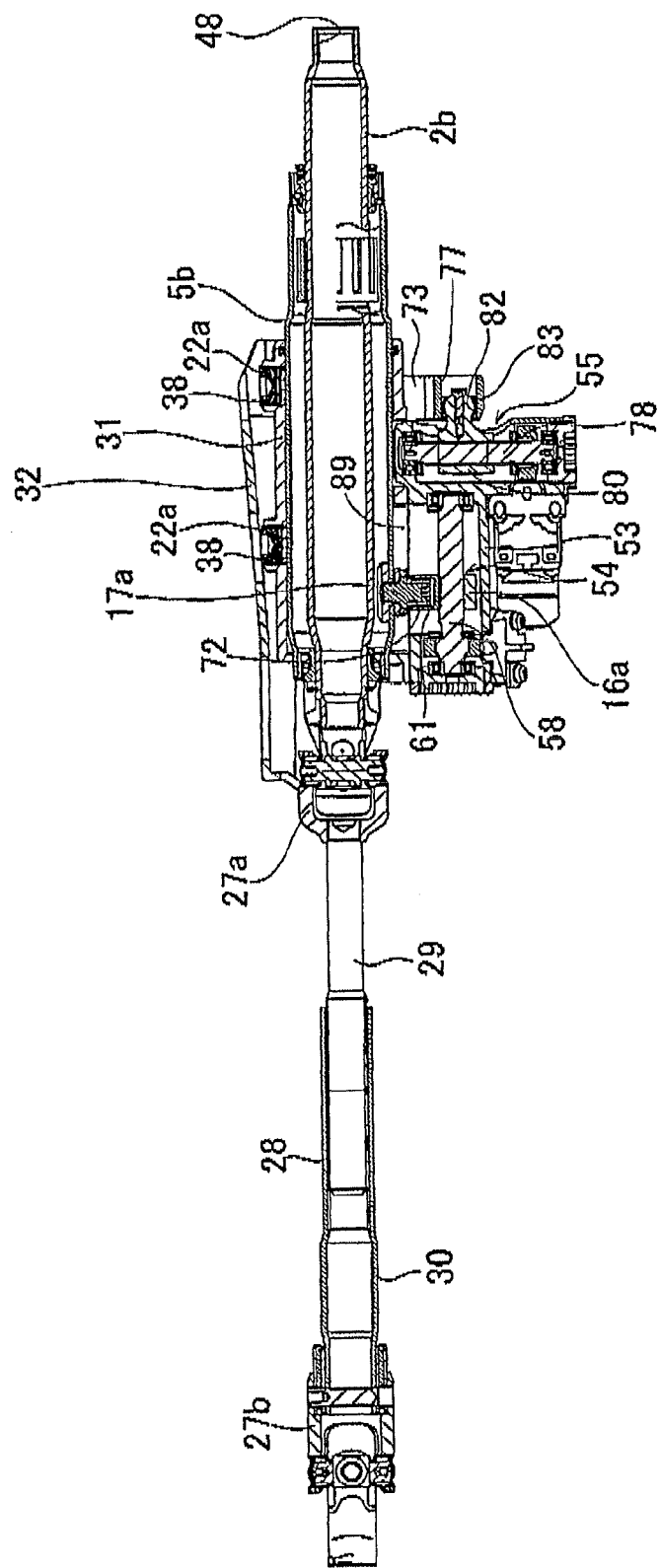
FIG. 1 is a vertical section side view illustrating a first example of an embodiment of the present invention.
Figure 2:
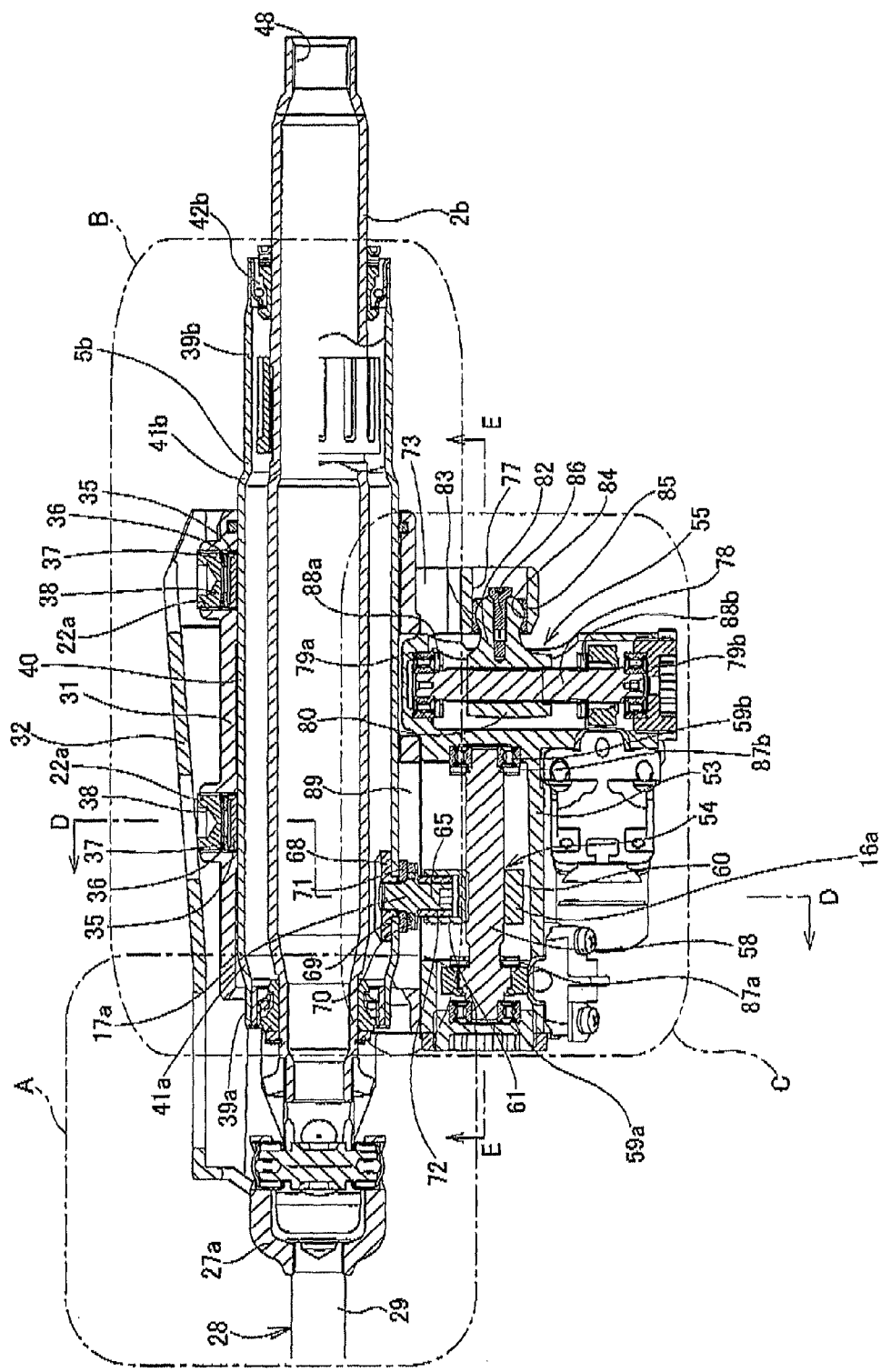
FIG. 2 is an enlarged view of the right half of FIG. 1.
Figure 5:
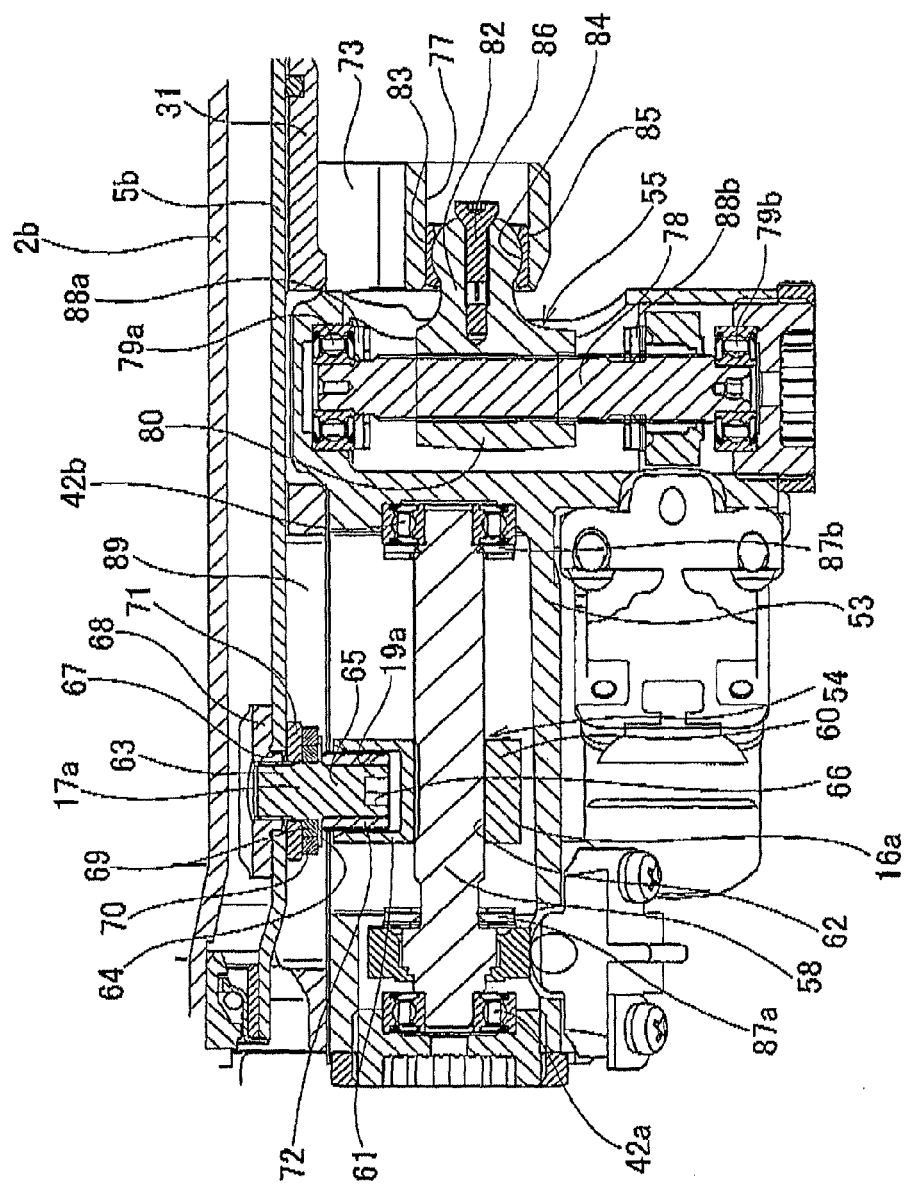
FIG. 5 is an enlarged view of area C in FIG. 2.
Figure 6:
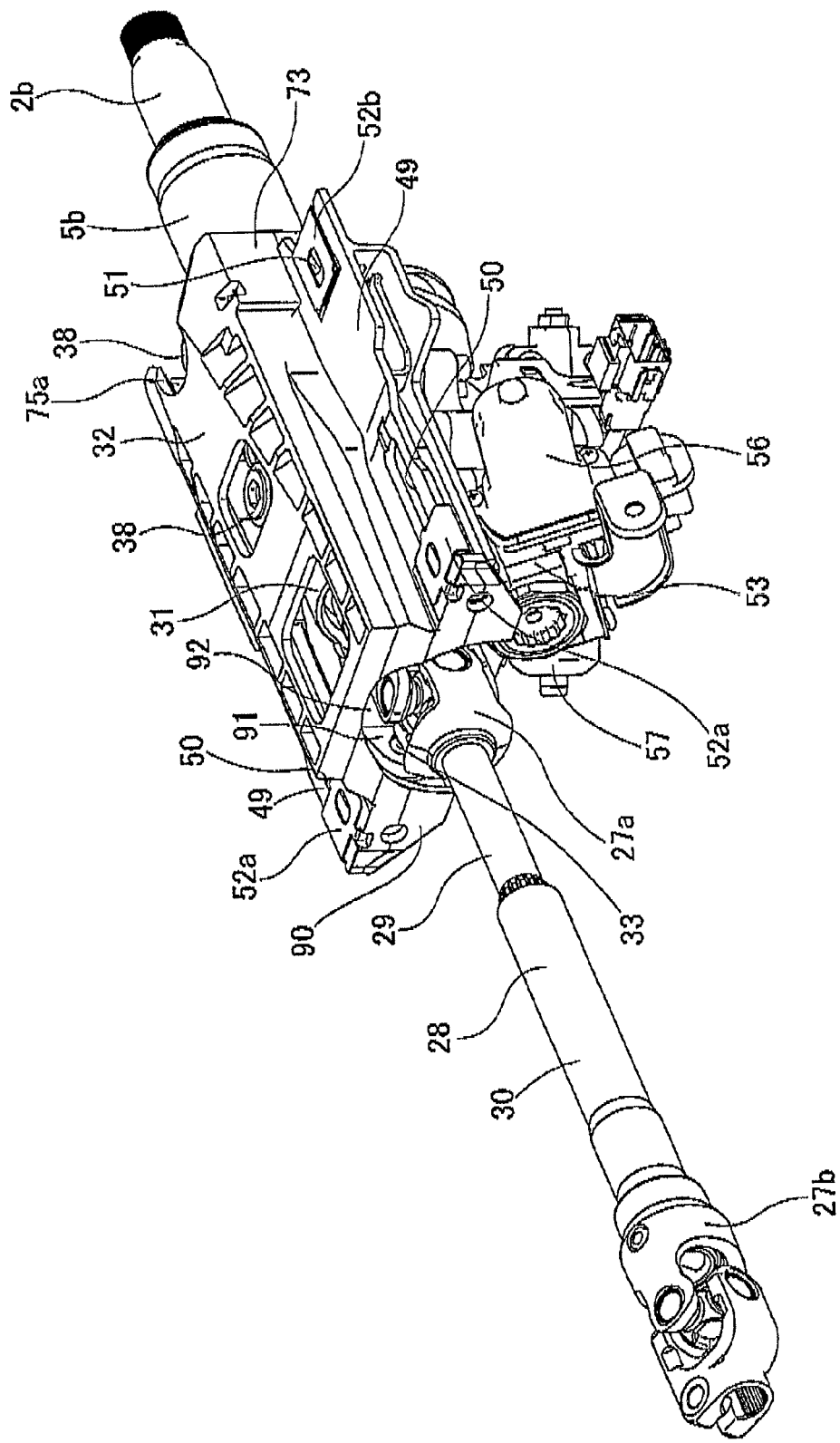
FIG. 6 is a perspective view of the first example, and illustrates the state as seen from above.
Figure 16:
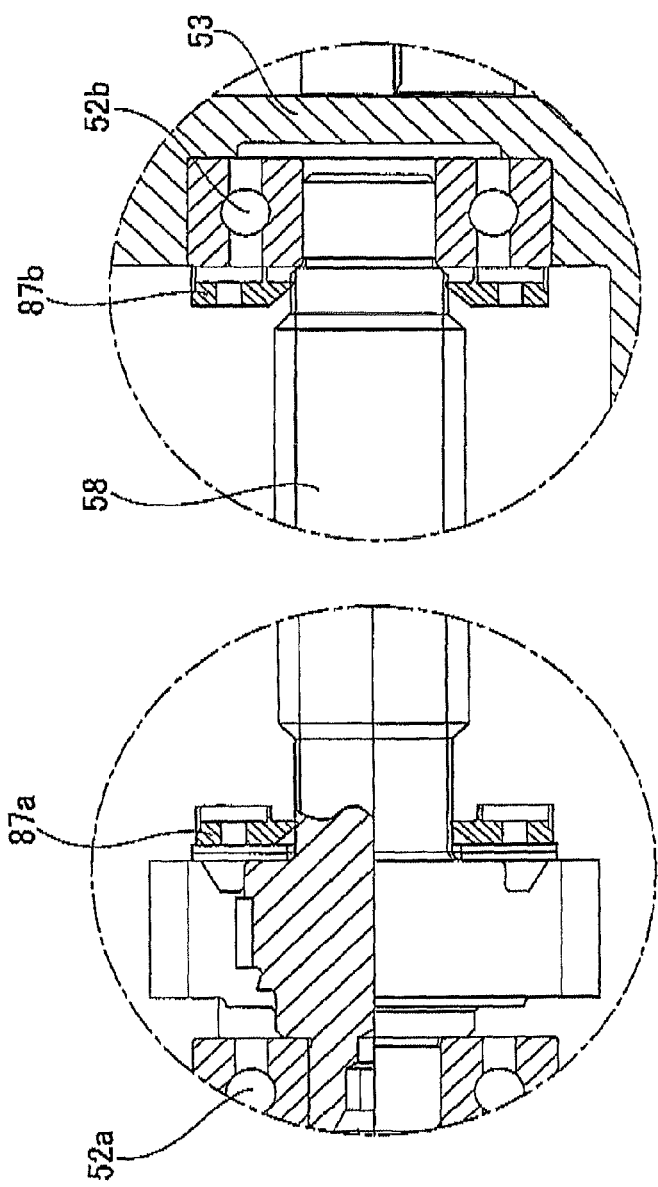
FIG. 16 is a partial enlarged cross-sectional view of the support sections on both the front and rear ends of a screw rod for adjusting the forward/backward position in the first example, and illustrates the state as seen from the same direction in FIG. 1 and FIG. 2.

An actuator casing 53 that is formed separate from the steering column 5b is joined and fastened to the portion of the column holder 31 on the bottom side of the steering column 5b by plural bolts. As illustrated in FIG. 2 and FIG. 5, a forward/backward direction feed screw apparatus 54 and an up/down feed screw apparatus 55 of an electric actuator are provided inside the actuator casing 53. In this example, an electric actuator for forward/backward position adjustment is composed of the forward/backward direction feed screw apparatus 54 and a forward/backward electric drive motor 56. The forward/backward direction feed screw apparatus 54 has the forward/backward electric drive motor 56 as a drive source, and is for causing the steering column 5b to displace in the forward/backward direction, and includes a forward/backward feed screw rod 58 that is arranged parallel with the steering column 5b, and a moving piece 16a that is composed of a forward/backward feed nut that is screwed onto the forward/backward feed screw rod 58. As illustrated in FIG. 5 and FIG. 16, both the front and rear end sections of the forward/backward feed screw rod 58 are supported by the actuator casing 53 by way of a pair of ball bearings 59a, 59b such that displacement in the axial direction is prevented and so as to only be able to rotate. The forward/backward feed screw rod 58 is connected to the forward/backward electric drive motor 56 by way of a worm reduction gear, and is rotated and driven by the forward/backward electric drive motor 56. In this example, the forward/backward feed screw apparatus 54 having the forward/backward electric drive motor 56 as a drive source is used; however, it is also possible to use a linear motor, such as a linear motion ultrasonic motor that has a brake function.

The moving piece (forward/backward feed nut) 16a has a base section 60 and a connecting section 61 that is provided in the upper part thereof. A screw hole 62 that screws onto the forward/backward feed screw rod 58 is formed in the base section 60. The connecting section 61 and the steering column 5b are connected by a transmission member 17a such that force can be transmitted in the forward/backward direction. The transmission member 17a is formed by performing cold forging of a material made of an iron-based alloy such as carbon steel or stainless steel, and a male screw section 63 is provided on the base-end section (top-end section), an outwardly protruding flange-shaped rim section 64 is provided in the middle section, and a circular column section 65 is provided on the tip-end section (bottom-end section). An engaging hole 66, such as a hexagonal hole, is formed in the surface of the tip end (bottom-end surface) of the circular column section 65 so that the tip-end section of a tool such as a hexagonal wrench can be engaged. There is no neck section in the transmission member 17a of this example where the outer diameter becomes particularly small.

As illustrated in FIG. 5 and FIG. 14, the transmission member 17a is fastened by screws to the bottom surface of the middle cylindrical section 40 of the steering column 5b so that tilting in the forward/backward direction is sufficiently suppressed. More specifically, a nut plate 68 is mounted to the steering column 5b from the inner circumferential surface side of the nut plate 68 by being crimped and fastened to the circumferential edge section of a through hole 67 that is formed in the bottom surface of the middle cylindrical section 40 of the steering column 5b, with a cylindrical section thereof being inserted into the through hole 67. An inner side spacer 69 having an outer diameter that is smaller than the outer diameter of the rim section 64 is placed on the top surface of the rim section 64, and an outer side spacer 70 is mounted around the outside of this inner side spacer 69. The inner side spacer 69 is made of a hard material such as an iron-based alloy. On the other hand, the outer side spacer 70 is made of a high polymer such as synthetic resin, hard rubber, hard vinyl or the like, or is made of a material such as soft metal that has a specified hardness, but also has a vibration absorption capability with a large internal loss. The inner side bottom surface of the outer side spacer 70 comes in contact with the outer diameter side top surface of the rim section 64, with the top surface of the inner side spacer 69 and the top surface of the outer side spacer 70 being located on the same plane. Furthermore, a ring spacer 71 is held between the top surfaces of the inner side spacer 69 and outer side spacer 70 and the bottom surface (outer circumferential surface of the bottom-end section) of the steering column 5b. The ring spacer 71 is made of a hard material such as an iron-based alloy, and has a wedge shaped cross-sectional shape; and the entire body of the ring spacer 71 is formed into a circular ring shape or a frame shape. The male screw section 63 that is provided on the top-end section of the transmission member 17a screws into the nut plate 68, and by further tightening, the transmission member 17a is securely supported by and fastened to the bottom surface of the middle section of the steering column 5. The transmission member 17a is supported by and fastened to the middle cylindrical section 40 of the steering column 5b that has a relatively large outer diameter, so does not obstruct the rotation of the steering shaft 2b. Moreover, by combining the transmission member 17a with the inner side spacer 69 that is made of a hard material, the outer side spacer 70 hardly becomes worn even after being used over a long period of time. Furthermore, even in the case in which the outer side spacer 70 drops downward from the rim section 64 and comes in contact with the moving piece 16a, the occurrence of strange noise due to the material thereof is suppressed.

The transmission member 17a that is supported by and fastened to the bottom surface of the middle cylindrical section 40 of the steering column 5b and the moving piece 16a that is screwed into the forward/backward feed screw rod 58 are combined so as to be able to transmit movement in the forward/backward direction, and to be capable of relative displacement in the axial direction of the transmission member 17a. More specifically, a concave engaging section 19a that is open on the top is provided in the center section of the connecting section 61 of the moving piece 16a, and the circular column section 65 of the transmission member 17a is inserted inside this concave engaging section 19a. A cylindrical shaped spacer 72 is located between the inner circumferential surface of the concave engaging section 19a and the outer circumferential surface of the circular column section 65 such that there is no backlash movement, and so that sliding in the axial direction of the circular column section 65 is possible. The inner circumferential surface and outer circumferential surface of the cylindrical shaped spacer 72 are such that, except for chamfered sections on both end sections in the axial direction, are cylindrical surfaces whose diameters do not change going in the axial direction.

With the transmission member 17a and the moving piece 16a combined, the moving piece 16a is not able to rotate with respect to the forward/backward feed screw rod, 58. As the forward/backward electric drive motor 56 rotates the forward/backward feed screw rod 58, the moving piece 16a moves along the forward/backward feed screw rod 58 in a direction corresponding to the rotation direction. The direction of movement of the moving piece 16a is basically parallel with the direction of movement of the steering column 5b, which is the direction of the center axis of the column holder 31. However, due to error in manufacturing or assembly of the product, the direction of movement of the moving piece 16a and the direction of movement of the steering column 5b may be a little nonparallel. For example, when the direction of the engaged section (bonded surface) of the bottom surface of the column holder 31 and the top surface of the actuator casing 53 does not match the direction of movement on the moving piece 16a or the direction of movement of the steering column 5b, these directions of movement may become a little nonparallel with each other. In this case, the transmission member 17a displaces in the axial direction of the transmission member 17a relative to the moving piece 16a. This relative displacement is performed while sliding over the area of contact between the inner circumferential surface of the cylindrical spacer 72 and the outer circumferential surface of the circular column section 65, and the area of contact between the outer circumferential surface of the cylindrical spacer 72 and the inner circumferential surface of the concave engaging section 19a. The circumferential surfaces are simple cylindrical surfaces, so highly precise processing without increased costs is possible, and there are sliding areas at two locations between these members, so relative displacement between these members is performed smoothly. In order that the transmission member 17a is able to displace in the forward/backward direction, a long hole 89 that extends in the forward/backward direction is provided in part of the column holder 31, the long hole 89 extending in the axial direction of the column holder 31.

Figure 8:
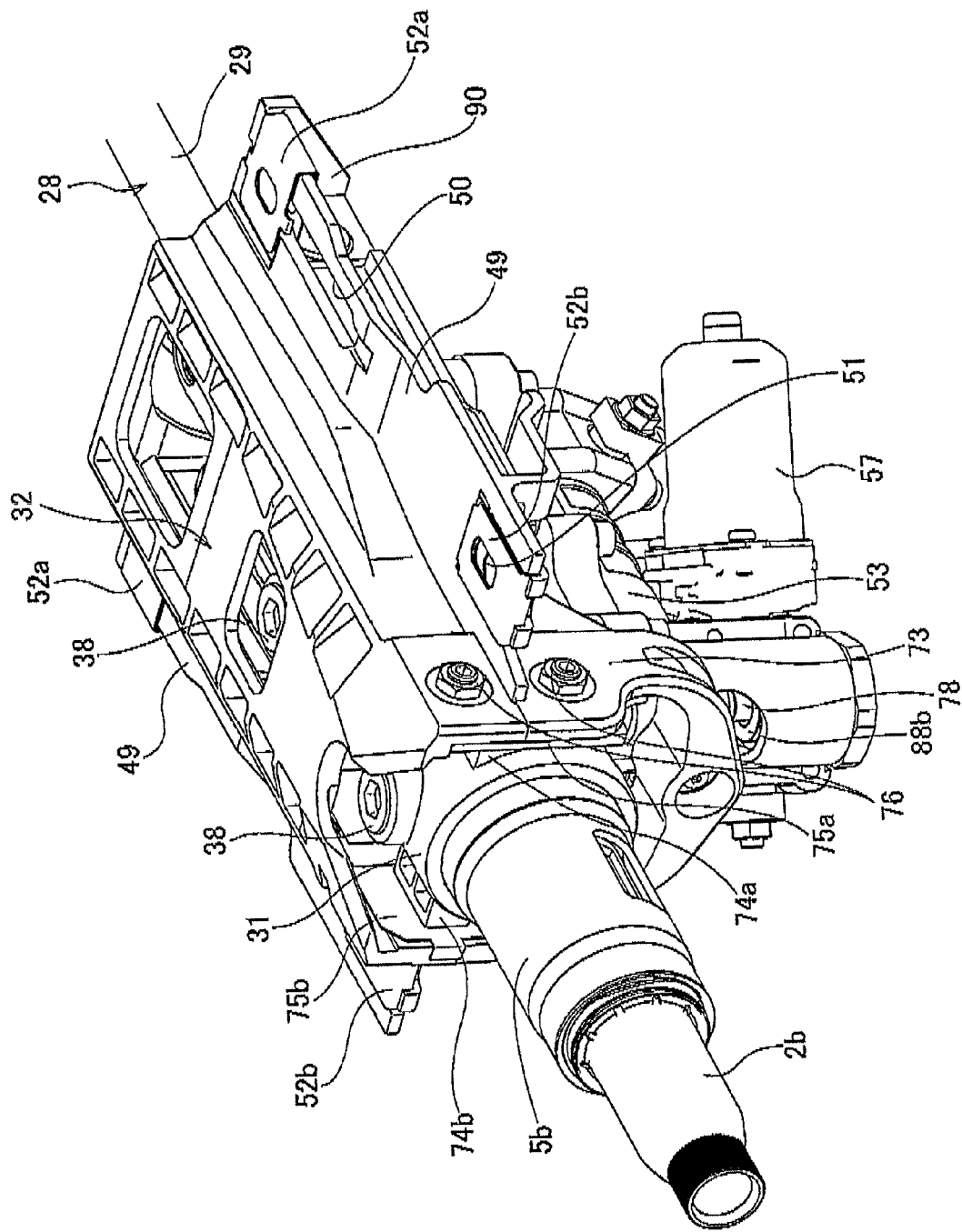
FIG. 8 is a perspective view illustrating the state of the opposite side of FIG. 7 as seen from above.
Figure 10:
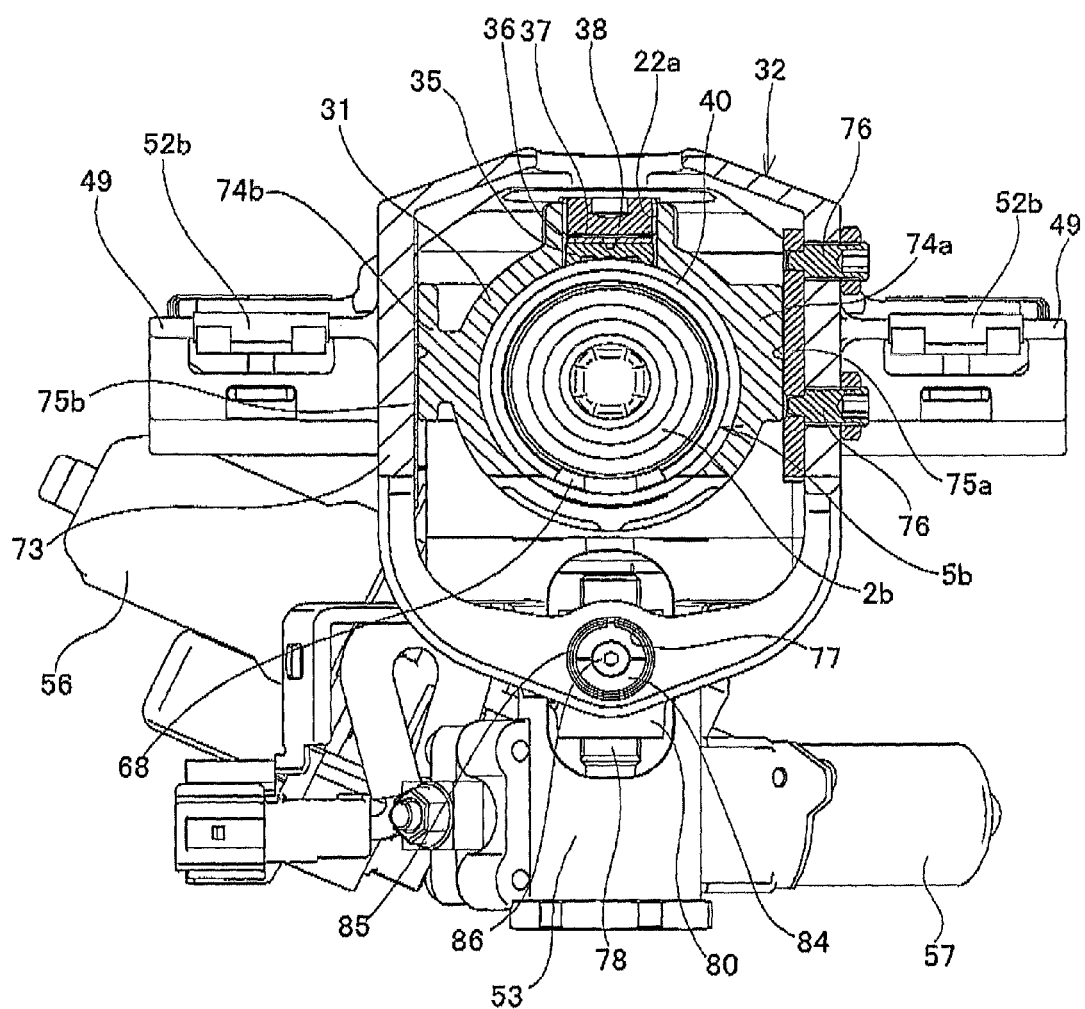
FIG. 10 is a partial cross-sectional view of the end surface of the state as seen from the right in FIG. 1 and FIG. 2.

In this example, there is a up/down feed screw apparatus 55 and an up/down electric drive motor 57 that function as an electric actuator for adjusting the position in the up/down direction. The up/down feed screw apparatus 55, with the up/down electric drive motor 57 as a drive source, causes the rear section of the steering column 5b to displace (go up or down) in the up/down direction. In this example, the up/down feed screw apparatus 55 is constructed so as to cause the entire column holder 31 to pivotally displace around a pair of tilt shafts 33 with respect to the vehicle body side bracket 32. More specifically, as illustrated in FIG. 8 and FIG. 10, a U-shaped holding frame 73 is provided on the rear-end section of the vehicle body side bracket 32, and the rear-end section of the column holder 31 is held inside this holding frame 73 so as to be able to move up and down, and such that there is no backlash movement. The holding frame 73 has inside surfaces that are parallel with each other. On the other hand, convex sections 74a, 74b having outside surfaces that are parallel to each other are provided on the both the left and right sides of the rear-end section of the column holder 31, and protrude outward in the width direction. The outside surfaces of the convex sections 74a, 74b and the inside surfaces of the holding frame 73 fit together by way of sliding plates 75a, 75b. One sliding plate 75a of the sliding plates 75a, 75b is thicker than the other sliding plate 75b. By pressing this thick sliding plate 75a toward the other sliding plate 75b by a pressure screw 76, backlash movement between the holding frame 73 and the column holder 31 is eliminated. The pressure screw 76, after being tightened to a specified torque, can be prevented from becoming loose by a lock nut. In this example, the up/down feed screw apparatus 55 having the up/down electric drive motor 57 is used, however, alternatively, it is also possible to use a linear motor such as a linear motion ultrasonic motor that has a brake function.

Figure 15:
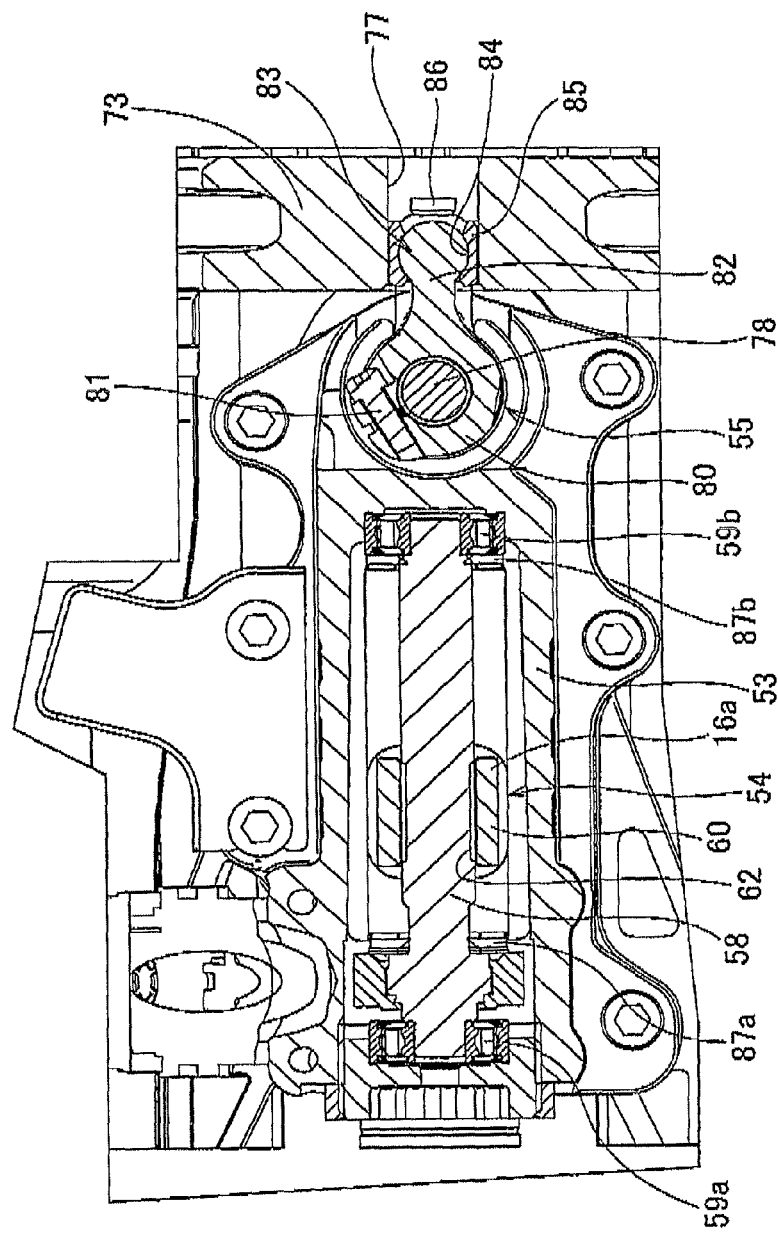
FIG. 15 is an enlarged cross-sectional view of section E-E in FIG. 2.
Figure 17:
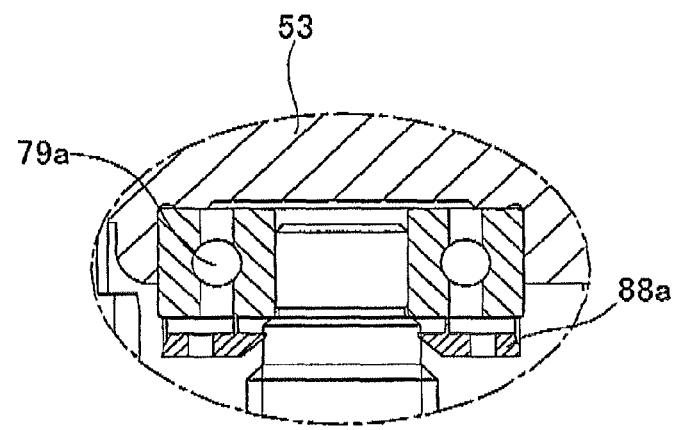
FIG. 17 is a partial enlarged cross-sectional view of the support sections on both the top and bottom ends of a screw rod for adjusting the up/down position in the first example, and illustrates the state as seen from the same direction in FIG. 1 and FIG. 2.
Figure 17:
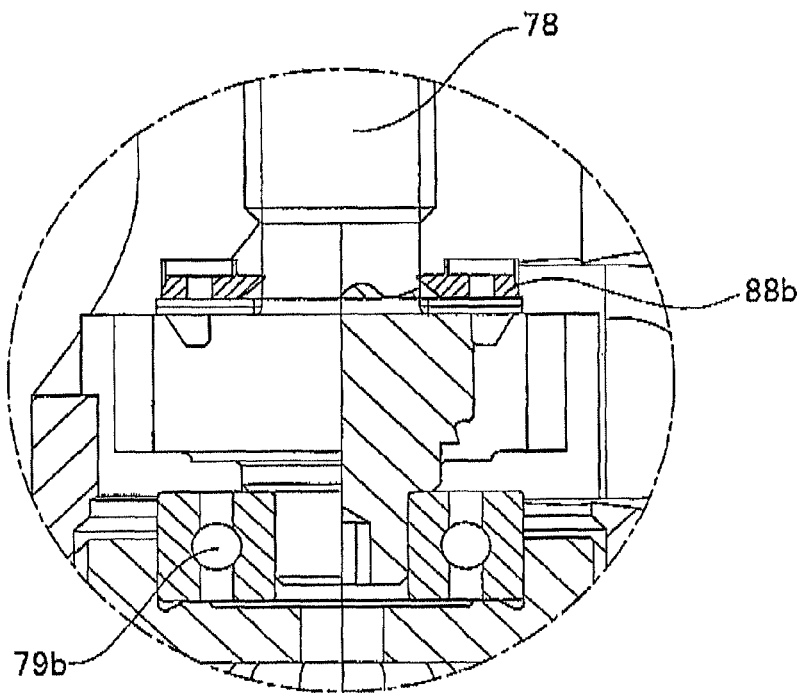

As a result of the combination of the engaging hole 77 that is provided in the center section in the width direction of the bottom-end section of the holding frame 73 and the up/down feed screw apparatus 55, the rear-end section of the column holder 31, as illustrated in FIG. 5 and FIG. 15, is able to move up and down (raise and lower) based on the current flowing to the up/down electric drive motor 57. As illustrated in FIG. 5 and FIG. 17, both the top and bottom end sections of an up/down feed screw rod 78 of the up/down feed screw apparatus 55 are supported by the actuator casing 53 by way of a pair of ball bearing 79a, 79b so that only rotation is possible. The up/down feed screw rod 78 is connected to the up/down electric drive motor 57 by way of a worm reduction gear, and is rotated and driven by the up/down electric drive motor 57.

An up/down feed nut 80 screws on to the middle section of the up/down feed screw rod 78. The up/down feed nut 80 is formed into a segmental annular ring shape using a metallic material such as an iron-based metal having elasticity, and by adjusting the interference in the screw section of the up/down feed screw rod 78 using a screw 81, it is possible to eliminate backlash movement in this screw section. Moreover, the tip-end section of an engaging arm 82, which is integrally provided on the up/down feed nut 80, and the engaging hole 77 are joined together by way of a spherical joint 83 so that force can be transmitted in the up/down direction, and so that pivotal displacement is possible. The spherical joint 83 has a spherical engaging section 84 that is formed on the tip-end section of the engaging arm 82 and has an outer circumferential surface of a partial spherical convex surface, and a spacer 85 that is formed into a cylindrical shape using a material such as synthetic resin that slides easily has an inner circumferential surface of a partial spherical concave surface. A screw hole is formed in the center of the spherical engaging section 84, and a slit is provided in the radial direction thereof so that the outer diameter of the spherical engaging section 84 can expand and contract elastically. More specifically, by causing a partial conical shaped convex surface that is formed on the head section of an adjustment screw 86 that is screwed into a screw hole in the spherical engaging section 84 to engage with a partial conical shaped concave surface that is formed in the opening of the screw hole in the spherical engaging section 84, it is possible to adjust the outer diameter of the spherical engaging section 84. By screwing the adjustment screw 86 a proper amount into the screw hole in the spherical engaging section 84, the occurrence of a gap in the spherical joint 83 is prevented. With this kind of construction, movement in the up/down direction is transmitted from the up/down feed nut 80 to the bottom-end section of the holding frame 73 without backlash movement.

Figure 7:
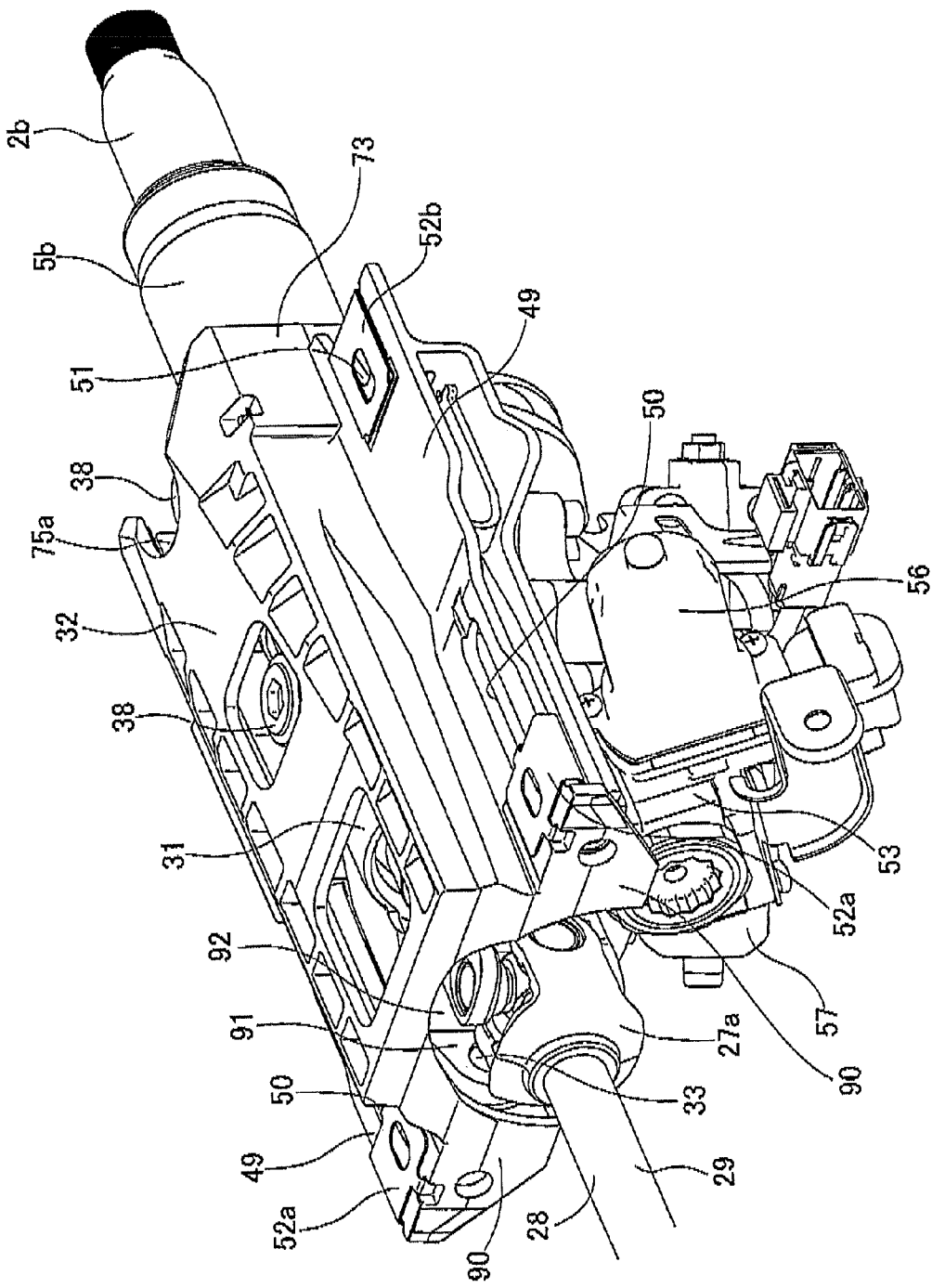
FIG. 7 is an enlarged view of the right half of FIG. 6.

As illustrated in FIG. 7 and FIG. 9, reinforcement ribs 90 are provided on both the left and right sides of the front-end section of the vehicle body side bracket 32, and these reinforcement ribs 90 maintain the strength and rigidity of the portion of the vehicle body side bracket 32 where the tilt axes 33 are located. Moreover, in order to pivotally support the column holder 81 by the tilt axes 33, reinforcement ribs 92 are also provided in the front-end section of the column holder 31 between a pair of left and right pivot support arm sections 91 that are provided on the front-end section of the column holder 31, and the main body of the column holder 31, and the strength and rigidity of these pivot support arm sections 91 is maintained. Therefore, in this example, the strength and rigidity of the pivotal support section for supporting the column holder 31 by the vehicle body side bracket 32 is sufficiently maintained, and the feel of operation when operating the steering wheel 1 is sufficiently prevented from becoming bad due to insufficient rigidity of this pivotal support section.

In the following, position adjustment of the steering wheel using the electric position adjustment apparatus for a steering wheel of this example will be explained. First, when adjusting the forward/backward position of the steering wheel 1, current flows to the forward/backward electric drive motor 56, and the forward/backward electric drive motor 56 rotates the forward/backward feed screw rod 58 a specified amount in a specified direction. As a result, the moving piece 16*a* moves in the forward/backward direction along the forward/backward feed screw rod 58, and by way of the transmission member 17*a*, the steering column 5*b* moves in the forward/backward direction on the inside of the column holder 31. As a result, the forward/backward position of the steering wheel 1 is adjusted to a desired position. When the steering wheel 1 is moved to an adjustable limit position, the moving piece 16*a* comes in contact with one of a pair of stoppers 87*a*, 87*b* such as illustrated in FIG. 16 that are provided in the portions near both ends of the forward/backward feed screw rod 58, and further movement is prevented. In this state, current flowing to the forward/backward electric drive motor 56 is stopped.

In a state where the forward/backward position of the steering wheel 1 is adjusted to a limit position, the portions on the end sections in the axial direction of the steering column 5*b* that are fastened on the inside by an interference fit of the outer rings 43*a*, 43*b* of the ball bearings 42*a*, 42*b* comes close to the inner circumferential surface of the end section of the column holder 31. There is a possibility that the end sections in the axial direction of the steering column 5*b* may deform a little due to fastening the outer rings 43*a*, 43*b* on the inside or due to the effect of chucking during processing. However, the end sections in the axial direction of the steering column 5*b* are reduced-diameter sections 39*a*, 39*b*, and there is no rubbing between the end sections in the axial direction of the steering column 5*b* and the inner circumferential surface of the end sections of the column holder 31. Therefore, even when the forward/backward position of the steering wheel 1 has been adjusted to the limit position, uncomfortable noise or vibration does not occur due to rubbing between the end section in the axial direction of the steering column 5*b* and the inner circumferential surface of the end sections of the column holder 31.

Next, when adjusting the up/down position of the steering wheel 1, electric current flows to the up/down electric drive motor 57, and the up/down electric drive motor 57 rotates the up/down feed screw rod 78 a specified amount in a specified direction. As a result, the up/down feed nut 80 moves in the up/down direction along and relative to the up/down feed screw rod 78. However, the up/down feed nut 80 does not move in the up/down direction due to the engagement of the engaging hole 77 and spherical engaging section 84, so the up/down feed screw rod 78 moves in the up/down direction, and as this happens, the actuator casing 53 and column holder 31 that support the up/down feed screw rod 78 pivotally displaces around the tilt shafts 33. As a result, the up/down position of the steering wheel 1 is adjusted to a desired position. In this case as well, when the steering wheel 1 is moved to an adjustable limit position, the up/down feed nut 80 comes in contact with one of a pair of stoppers 88*a*, 88*b* as illustrated in FIG. 17 that are provided in the portions near both ends of the up/down feed screw rod 78, and further movement is prevented. In this state, electric current flowing to the up/down electric drive motor 57 is stopped.

In the electric position adjustment apparatus for a steering wheel of this example, the steering shaft 2*b* and the steering column 5*b* are integrally constructed so that in at least the normal state the entire length does not extend or contract, so the rigidity of the steering shaft 2*b* and the steering column 5*b* is sufficiently maintained. Therefore, it is possible to suppress handle vibration and improve the steering performance. Moreover, a single steering shaft 2*b* is arranged inside a non-divided steering column 5*b* in this way, so joined section that are the cause of backlash movement do not exist in the portion of the steering column apparatus. Therefore, the occurrence of backlash movement in the portion of the steering column apparatus is suppressed, and it is possible to increase the resonant frequency of this portion. As a result, it becomes possible to avoid resonance with traveling vibration having a low resonant frequency, or with the engine vibration in a state of large oscillation.

The pair of sliding plates 35, that are maintained in series at two longitudinally spaced locations of the column holder 31 which holds the steering column 5*b* so as to displace in the axial direction, elastically presses the middle cylindrical section 40 of the steering column 5*b* toward the inner circumferential surface of the column holder 31, so backlash movement between the steering column 5*b* and the column holder 31 is also eliminated. Particularly, by bringing the outer circumferential surface of the middle cylindrical section 40 that has a relatively large diameter in contact with the sliding plates 35, the contact area between these members becomes large, so it is possible to make the force by which the sliding plates 35 press the steering column 5*b* relatively small. Moreover, the interval in the axial direction between the portions where the sliding plates 35 press the outer circumferential surface of the steering column 5b can be kept large by the amount that the steering column 5b moves in the forward/backward direction, so the rigidity of the engaging section between the steering column 5b and the column holder 31 is sufficiently maintained. Furthermore, by utilizing the moment that occurs between the sliding section between the sliding plates 35 and the outer circumferential surface of the steering column 5b, it is also possible to make the pressing force of the sliding plates 35 against the steering column 5b relatively small. With this kind of construction, the load that occurs when moving the steering wheel 1 in the forward/backward direction can be made small, so it is possible to reduce the operating sound of the forward/backward electric drive motor 56. Moreover, even when the tolerance of the inner diameter dimension of the column holder 31 and the tolerance of the outer diameter dimension of the steering column 5b are the same as before, it is possible to eliminate backlash movement, and thus it is possible to keep tilting of the steering column 5b and the transmission member 17a small. Therefore, it is not necessary to use a spherical shape having high displacement absorbency for the tip-end section of the transmission member 17a, and it is possible to use a simple shape such as a circular column shape.

In the apparatus of this example, construction is such that the entire length of the steering shaft 2b and the steering column 5b does not extend or contract, so as the forward/backward position of the steering wheel 1 is adjusted, the universal joint 27a and the center position of the joint spider 34, which is the center of displacement of the universal joint 27a, displace in the axial direction of the steering shaft 2b and steering column 5b. On the other hand, when adjusting the forward/backward position of the steering wheel 1, the installation positions of the tilt shafts 33 that are provided between the front-end section of the column holder 31 and the front-end section of the vehicle body side bracket 32 do not change even though the forward/backward position of the steering wheel 1 is adjusted.

Therefore, depending on the forward/backward position of the steering wheel 1, the center position of the joint spider 34 is not positioned on the center line of the tilt shaft 33. In this state, when the column holder 31 is pivotally displaced around the tilt shafts 33 in order to adjust the up/down position of the steering wheel 1, the center position of the joint spider 34 pivotally displaces around the tilt shafts 33. Due to this kind of pivotal displacement of the center position of the joint spider 34, the distance between the rear side universal joint 27a that includes this joint spider 34 and the front side universal joint 27b changes. The change in this distance is absorbed by the extension or contraction of the intermediate shaft 28. However, in order to extend or contract the intermediate shaft 28, a force that overcomes the friction resistance that acts in the engaging section between the intermediate inner shaft 29 and the intermediate outer shaft 30 is necessary. Due to this kind of friction resistance, the resistance against the pivotal displacement of the column holder 31 becomes large, and there is a possibility that smooth adjustment of the up/down position of the steering wheel 1 will be hindered. The extent that this smooth operation is hindered becomes more extreme the greater the amount that the intermediate shaft extends or contracts when the up/down position is adjusted, and the larger the resistance is that occurs as the intermediate shaft 28 is extended or contracted.

In the construction of this example, the center line $O_C$ of the tilt shafts 33 is located in the center position in the forward/backward direction between the center position $O_F$ of displacement on the front-end side and the center position $O_B$ of displacement on the rear-end side. Therefore, even in a state where the center position of the joint spider 34 is not positioned on the center line $O_C$ of the tilt shafts 33, it is possible to keep the radius of the pivotal displacement of the center position of the joint spider 34 due to pivotal displacement of the column holder 31 around the tilt shafts 33 small. By keeping this radius small, it is possible to keep the amount of extension or contraction of intermediate shaft 28 due to adjustment of the up/down position small, and it is possible to keep that resistance during extension or contraction of the intermediate shaft 2 small. As a result, it becomes possible to smoothly perform up/down position adjustment of the steering wheel 1 regardless of the forward/backward position of the steering wheel 1.

Figure 18:
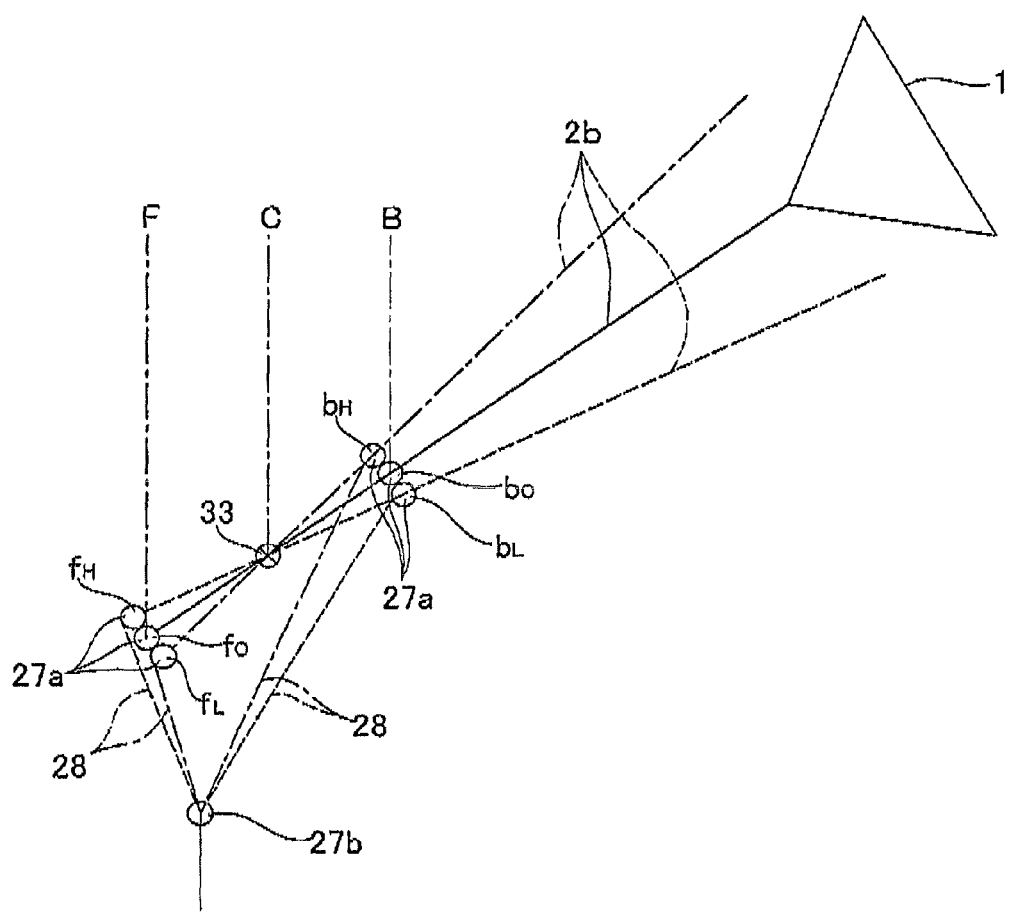
FIG. 18 is a schematic drawing for explaining the state in the first example when the amount of extension or contraction of an intermediate shaft changes according to the forward/backward position of the steering wheel as the adjustment of the up/down position of the steering wheel is adjusted.

In FIG. 18, the positions represented by F, C and B illustrate the displacement center positions of the universal joint 27a in the states when the steering wheel 1 is moved to the adjustable front-end position, center position and rear-end position, with the up/down position of the steering wheel being the neutral state. With the forward/backward position of the steering wheel 1 at the center position, and with the center position of displacement of the universal joint 27a located on the center line of the tilt shafts 33, the intermediate shaft 28 does not extend or contract, and the universal joint 27a does not raise or lower as the up/down position of the steering wheel 1 is adjusted. Therefore, the intermediate shaft 28 and the universal joint 27a do not resist adjustment of the up/down position of the steering wheel 1.

On the other hand, when adjusting the up/down position in a state where the steering wheel 1 has moved to the front-end position indicated by F, the center position of displacement of the universal joint 27a displaces between $f_H$ and $f_L$ with $f_O$ being the center, and the intermediate shaft 28 extends or contracts due to this displacement. As can be seen from FIG. 18, the amount of extension or contraction between $f_H$ and $f_L$ becomes relatively large. The amount of extension or contraction increases the longer is the distance from the tilt axes 33 to the center position of displacement of the universal joint 27a. In the construction of this example, by placing the position of the center line $O_C$ of the tilt axes 33 at the middle position between the center position of displacement $O_F$ on the front-end side and the center position of displacement $O_B$ on the rear-end side, it is possible to suppress the maximum value of the distance that the center position of displacement of the universal joint 27a is separated from the tilt axes 33 when compared with construction in which the center line $O_C$ is located further toward the rear than the center position of displacement $O_B$ on the rear-end side. Therefore, even in the case where the up/down position of the steering wheel 1 is adjusted with the steering wheel 1 moved to the forefront position, the amount of extension or contraction is kept small, and adjustment of the up/down position can be performed smoothly.

On the other hand, in the state where the steering wheel 1 is moved to the rear-end position indicated by B, the universal joint 27a that connects the front-end section of the steering shaft 2b and the rear-end section of the intermediate shaft 28 is located further toward the rear than the tilt axes 33. When adjusting the up/down position in this state, the center position of displacement of the universal joint 27a displaces between $b_H$ and $b_L$, with $b_O$ as the center, and the intermediate shaft 28 extends or contacts due to this displacement. As can be seen from FIG. 18, the amount of extension or contraction is kept relatively small. Instead, when adjusting the up/down position of the steering wheel 1, the portion that includes the universal joint 27a becomes the load of the up/down electric drive motor 57 of the electric actuator for up/down position adjustment. This is because, unlike in the case when the universal joint 27a is further toward the front than the tilt axes 33, the weight of the portion of the universal joint 27a is not offset by the other portions. Therefore, the load on the up/down electric drive motor 57 during adjustment of the up/down position of the steering wheel 1 becomes large, and the need for the use of a larger motor becomes disadvantageous for making the electric position adjustment apparatus for a steering wheel more compact and lightweight. This tendency becomes more severe the greater the distance that the universal joint 27a is separated toward the rear from the tilt axes 33 becomes. However, in this example, the positional relationship of the center line $O_C$ of the tilt axes 33 and the center positions of displacement $O_F$, $O_B$ is regulated as described above, so when compared with construction in which the center line $O_C$ is located further toward the front than the center position of the displacement $O_F$, it is possible to suppress the maximum value of the distance that the universal joint 27a is separated toward the rear from the tilt axes 33. Therefore, the extent that the load on the up/down electric drive motor 57 becomes large can be suppressed, and it becomes easy to make the apparatus more compact and lightweight.

Locating the center line $O_C$ of the tilt axes 33 at the middle position in the forward/backward direction is also advantageous from the aspect of suppressing torque fluctuation of the torque required for operating the steering wheel 1. In other words, the cross-axis universal joints 27a, 27b are such that when transmitting torque in a state in which a joint angle is applied, the torque characteristic (torque loss) changes in correspondence with the phase change in the rotational direction thereof. When such change in the torque characteristic is left as is, a strange feeling is given to the driver that operates the steering wheel 1. Therefore, by suitably making the phase in the rotational direction of the universal joints 27a, 27b different, the changes in the torque characteristics of these universal joints 27a, 27b offset each other. In this case, it is necessary that the relationship between the joint angles of the universal joints 27a, 27b and the shift in phase in the rotational direction be made suitable, however, in the construction of this example, the position of universal joint 27a on the rear side shifts due to the forward/backward position adjustment of the steering wheel 1. As a result, the relationship between the joint angles of the universal joints 27a, 27b shifts from the initial relationship. When this shift is large, the change in the torque characteristic of these universal joints 27a, 27b cannot be sufficiently suppressed, and there is a possibility that this will give the driver that is operating the steering wheel 1 a strange feeling. However, in the construction of this example, this shift can be kept small, so it is possible to keep the possibility of giving the driver that operates the steering wheel 1 a strange feeling small.

Moreover, the sliding plate 35 presses the steering column 5b downward toward the forward/backward feed screw apparatus 54, so no moment is generated in the horizontal direction due to this pressure, and as the forward/backward feed screw apparatus 54 operates and stops, backlash movement of the steering column 5b inside the column holder 31, and up/down movement of the steering column 5b during inversion of the displacement operation are suppressed. Even when it is necessary to perform a finishing process of the outer circumferential surface of the middle cylindrical section 40 in order to improve the precision of the engagement between the outer circumferential surface of the steering column 5b and the inner circumferential surface of the column holder 31, the outer circumferential surface of the middle cylindrical section 40 has the largest diameter of the outer circumferential surface of the steering column 5b, so the finishing process of the outer circumferential surface of this middle cylindrical section 40 is not hindered by the other parts, and can be performed easily and efficiently. Moreover, the support rigidity of the steering wheel 1 can also be easily adjusted by changing the thickness of the metal plate of the steering column 5b and steering shaft 2b. Furthermore, the portion of the steering column 5b that is pressed by the sliding plates 35 is located in portion of the steering column 5b having the largest diameter, so the surface area of this pressed portion can be increased, and thus it is not necessary to make the pressure force of the sliding plates 35 on the steering column 5b excessively large. The effect of suppressing backlash movement can be obtained with a small pressure force such as this, so the load during operation is stable and small, and it is also possible to reduce the operating sound of the forward/backward electric drive motor 56.

In the construction of this example, the shape of the transmission member 17 and cylindrical spacer 72 for transmitting the movement of the moving piece 16a of the forward/backward feed screw apparatus 54 to the steering column 5b is simple, so it is possible to manufacture the transmission member 17a and cylindrical spacer 72 with good precision and at low cost by cold forging.

Moreover, the relative displacement in the axial direction of the transmission member 17a between this transmission member 17a and the moving piece 16a is compensated for at two locations; the inner circumferential surface and outer circumferential surface of the cylindrical spacer 72, and the outer circumferential surface of the tip-end section of the transmission member 17a and the inner circumferential surface of the concave engaging section 19a that is provided on the moving piece 16a. Therefore, due to the bad precision on the contact surface of the bottom surface of the column holder 31 and the top surface of the actuator casing 53, the direction of movement of the moving piece 16a and the direction of movement of the steering column 5b during forward/backward position adjustment of the steering wheel 1 become non-parallel, and even when the transmission member 17a and the moving piece 16a displace relative to each other in the axial direction of transmission member 17a along with the forward/backward position adjustment, there is rubbing at two locations, so the rubbing lengths can be made short, and thus it is possible to suppress the occurrence of strange noise and vibration. Furthermore, there are no neck sections, which are disadvantageous from the aspect of maintaining strength and rigidity, in the transmission member 17a, so the durability and reliability of the forward/backward feed screw apparatus 54 is maintained.

Furthermore, in the construction of this example, the up/down feed screw rod 78 of the up/down feed screw apparatus 55 is located directly below the column holder 31 in the radial direction of the column holder 31, so when adjusting the up/down position of the steering wheel 1, no harmful moment is applied to the column holder 31. Therefore, it is possible to smoothly perform this up/down position adjustment. From the aspect of maintaining support rigidity of the column holder 31 and also maintaining the support rigidity of the steering wheel 1, preferably the holding frame 73 for guiding the up/down position adjustment is located as far as possible to the rear within a range so as not to interfere with the portion that is fastened to the steering column 5b regardless of forward/backward movement of the steering column during forward/backward position adjustment of the steering wheel 1. Moreover, in order to smoothly perform up/down adjustment of the steering wheel 1, preferably a lubricant such as grease or the like is applied to the sliding plates 75a, 75b. Furthermore, from the aspect of being able to smoothly perform adjustment of the steering wheel 1 in the up/down direction and forward/backward direction, and to keep the installation space of the forward/backward feed screw apparatus 54 and up/down feed screw apparatus 55 small, preferably the up/down feed screw rod 78 and the forward/backward feed screw rod 58 are located in directions such that the respective center axes are orthogonal to each other.

Second Example

Figure 19:
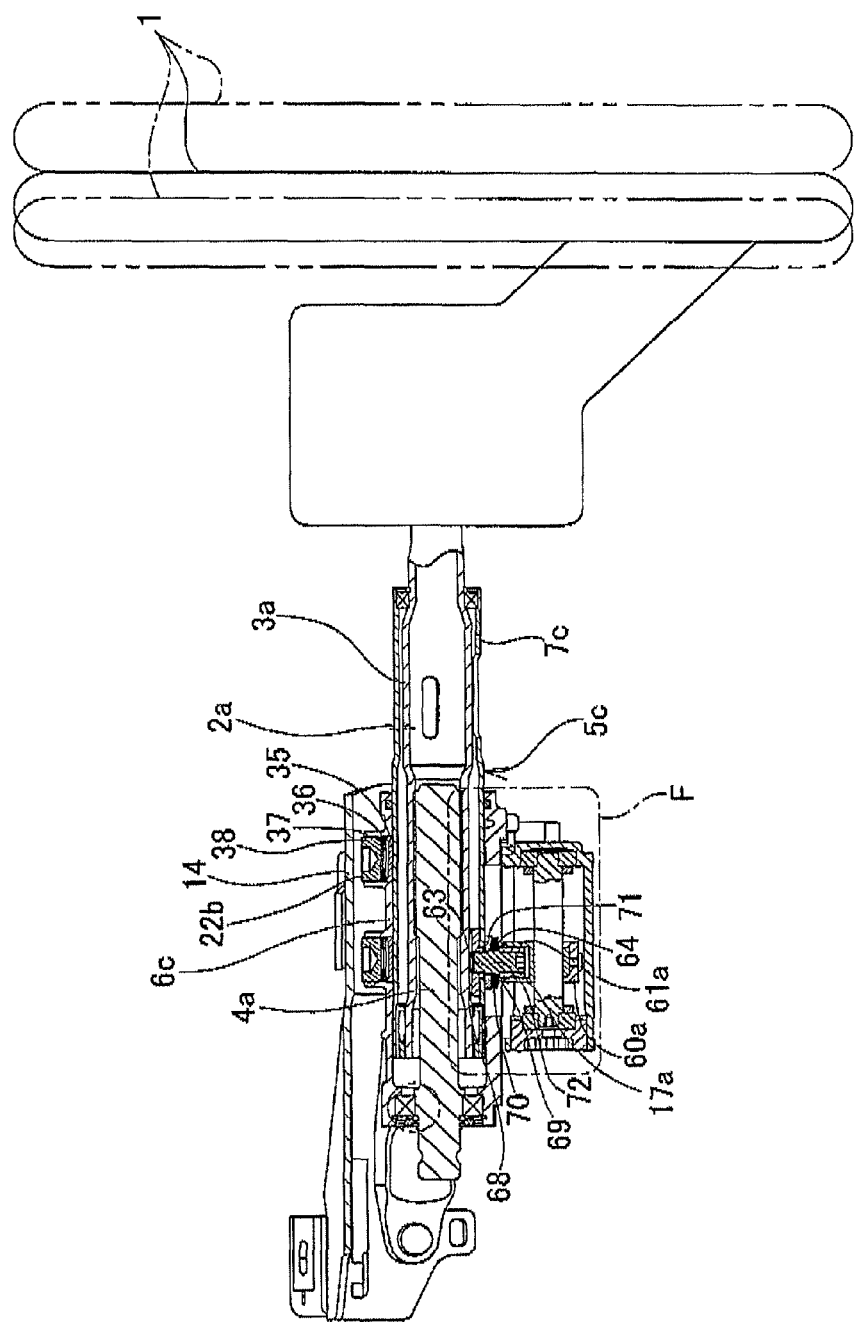
FIG. 19 is a vertical section side view illustrating a second example of an embodiment of the present invention.
Figure 20:
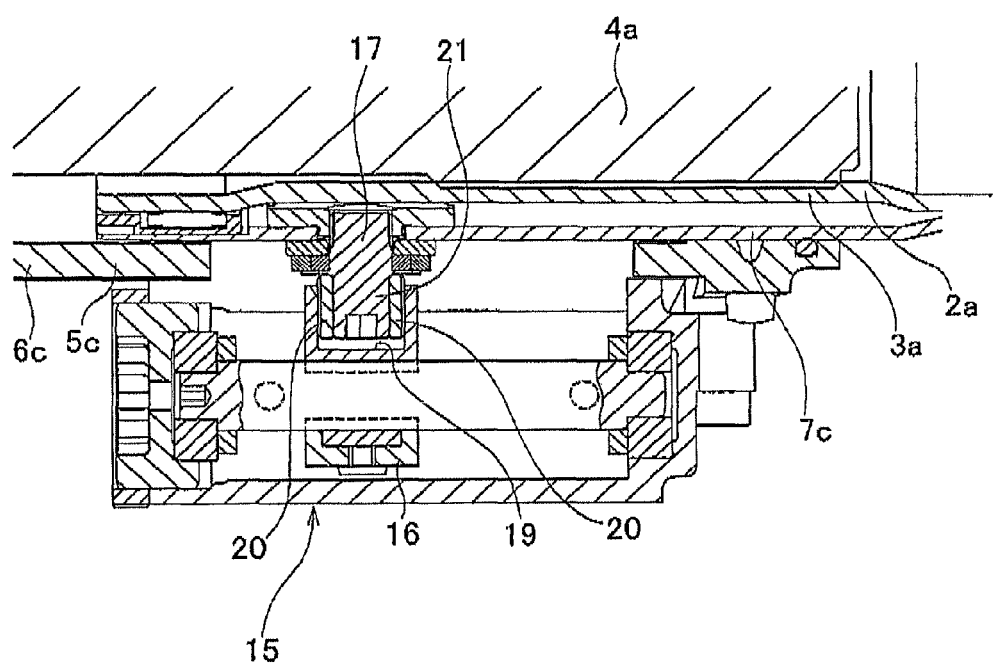
FIG. 20 is an enlarged view of area F in FIG. 19.

FIG. 19 and FIG. 20 illustrate a second example of an embodiment of the present invention. This example is of the case in which the construction of the present invention is applied to the second example of conventional structure. In this example, a steering shaft 2a is composed of a cylindrical outer shaft 3a, and a circular rod shaped inner shaft 4a that is inserted into the outer shaft 3a so as to be able to slide in the axial direction and so as to be able to transmit rotational force. Moreover, a steering column 5c of a column unit of the present invention is composed of a cylindrical outer column 6c that is supported by an installation bracket 14, and a cylindrical inner column 7c that is inserted inside the outer column 6c so as to be able to slide in the axial direction. The steering shaft 2a is supported on the inside of the steering column 5c so as to be able to rotate freely, and the outer shaft 3a and inner column 7c move in the forward/backward direction relative to the inner shaft 4a and outer column 6c. In this example, the outer column 6c corresponds to a support section of the column unit of the present invention, and the inner column 7c corresponds to an adjusted section of the column unit of the present invention.

As illustrated in FIG. 19, in this example, in order to eliminate backlash movement of the inner column 7c with respect to the outer column 6c, retaining holes 22b are formed at two locations that are separated in the forward/backward direction in the top surface of the outer column 6c so as to connect the inner circumferential surface and outer circumferential surface of the outer column 6c. On the inside of each retaining hole 22b, in order from the inside, there is a sliding plate 35, a washer 36 and a disc spring 37, and the opening on the top end of each retaining hole 22b is covered by a screw cap 38. In this state, the sliding plate 35 that is located in the inner side end section of each retaining hole 22b presses against the outer circumferential surface (top surface) of the inner column 7c by way of the elastic force from the disc spring 37.

In this example, construction is such that a linear motion ultrasonic motor 15a that is supported by the bottom end section of an installation bracket 14 causes the inner column 7c to displace in the axial direction with respect to the outer column 6c. A moving piece 16b that is provided in the linear motion ultrasonic motor 15a so as to be able to move in the axial direction (forward/backward direction) of the steering column 5c has a base section 60a that is connected to the linear motion ultrasonic motor 15a, and a connecting section 61a that is provided above the base section 60a, and there is a concave engaging section 19b provided in the center section of this connecting section 61.a.

In this example as well, a transmission member 17a is such that there is a male screw section 63 on the top-end section, an outwardly protruding flange-shaped rim section 64 in the middle section, and a circular column section 66 on the bottom-end section. In a state with a ring spacer 71 being held between top surfaces of an inner side spacer 69 and an outer side spacer 70 that are located on the top surface of the rim section 64 and the inner column 7c, the transmission member 17a is fastened by screws to the inner column 7c. The circular column section 65 of the transmission member 17a is placed inside the concave engaging section 19b of the moving piece 16b by way of the cylindrical spacer 72 such that there is no backlash movement, and is able to slide in the axial direction of the transmission member 17a.

The concave engaging section 19b of the moving piece 16b has a cylindrical concave-shaped inner-circumferential surface whose inner diameter does not change in the axial direction of the transmission member 17a, and the circular column section 65 on the tip-end section of the transmission member 17a has a cylindrical convex-shaped outer-circumferential surface whose outer diameter does not change in the axial direction of the transmission member 17a, and the cylindrical spacer 72 has a cylindrical convex-shaped outer-circumferential surface whose outer diameter does not change in the axial direction of the transmission member 17a and a cylindrical concave-shaped inner-circumferential surface whose inner diameter does not change in the axial direction of the transmission member 17a. The other construction and functions of this example are the same as in the first example of an embodiment.

INDUSTRIAL APPLICABILITY

The electric position adjustment apparatus for a steering wheel of the present invention, as in the embodiment descried above, is suitably applied to an electric tilt telescopic steering apparatus that is able to perform adjustment of not only the forward/backward position of a steering wheel, but also perform adjustment of the up/down position. However, the electric position adjustment apparatus for a steering wheel of the present invention can also be applied to an electric telescopic steering apparatus that does not have a tilt mechanism and is constructed so as to only be able to adjust the forward/backward position of the steering wheel. Moreover, the construction for installation in a vehicle, and the construction for connecting the steering shaft and universal joints are also not limited, and the present invention can be widely applied to an electric position adjustment apparatus for a steering wheel that is assembled in an electric steering apparatus for which various kinds of previously known structure are employed.

EXPLANATION OF REFERENCE NUMBERS

1 Steering wheel
2, 2a, 2b Steering shaft
3, 3a Outer shaft
4, 4a Inner shaft
5, 5a, 5b, 5c Steering column
6, 6a, 6b, 6c Outer column
7, 7a, 7b, 7c Inner column
8 Gear housing
9 Feed nut
10 Push-pull arm
11 Push-pull rod
12 Male screw section
13 Worm reduction gear
14 Installation bracket
15, 15a Linear motion ultrasonic motor
16, 16b Moving piece
16a Moving piece (forward/backward feed nut)
17, 17a Transmission member
18 Spherical joint
19, 19a, 19b Concave engaging section
20 Spacer
21 Spherical engaging section 22, 22a, 22b Retaining hole
23 Female screw
24 Adjustment screw
25 Disc spring
26 Pad
27a, 27b Universal joint
28 Intermediate shaft
29 Intermediate inner shaft
30 Intermediate outer shaft
31 Column holder
32 Vehicle body side bracket
33 Tilt shaft
34 Joint spider
35 Sliding plate
36 Washer
37 Disc spring
38 Screw cap
39a, 39b Reduced-diameter section
40 Middle cylindrical section
41a, 41b Inclined surface section
42a, 42b Ball bearing
43a, 43b Outer ring
44a, 44b Inner ring
45 Retaining ring
46 Push nut
47 Elastic material
48 Screw hole
49 Installation plate section
50 Long hole
51 Notch
52a, 52b Sliding plate
53 Actuator casing
54 Forward/backward feed screw apparatus
55 Up/down feed screw apparatus
56 Forward/backward electric drive motor
57 Up/down electric drive motor
58 Forward/backward feed screw rod
59a, 59b Ball bearing
60, 60a Base section
61, 61a Connecting section
62 Screw hole
63 Male screw section
64 Rim section
65 Circular column section
66 Engaging hole
67 Through hole
68 Nut plate
69 Inner side spacer
70 Outer side spacer
71 Ring spacer
72 Cylindrical shaped spacer
73 Holding frame
74a, 74b Convex section
75a, 75b Sliding plate
76 Pressure screw
77 Engaging hole
78 Up/down feed screw rod
79a, 79b Ball bearing
80 Up/down feed nut
81 Screw
82 Engaging arm
83 Spherical joint
84 Spherical engaging section
85 Spacer
86 Adjustment screw
87a, 87b Stopper
88a, 88b Stopper
89 Long hole in the forward/backward direction
90 Reinforcement rib
91 Pivot support arm section
92 Reinforcement rib

What is claimed is:

1. An electric position adjustment apparatus for a steering wheel, comprising:
 a steering shaft, with a steering wheel being supported by and fastened to a rear-end section thereof;
 a column unit that comprises: a support section that extends in an axial direction of the steering shaft, supports the steering shaft on an inside thereof so as to be able to freely rotate, is supported by a portion that is fastened to a vehicle body or a vehicle body side bracket that is supported by a portion that is fastened to the vehicle body and does not displace during position adjustment of the steering wheel; and an adjusted section that is supported by the support section so as to be able to displace in the axial direction of the steering shaft with at least part of the steering shaft during position adjustment of the steering wheel;
 a moving piece that comprises a concave engaging section, and is able to displace in an axial direction of the column unit with an electric motor as a driving source; and
 a transmission member that comprises a base-end section that is connected to and fastened to the adjusted section, and a tip-end section that engages with the concave engaging section of the moving piece by way of a spacer, and that is able to transmit movement of the moving piece to the adjusted section, and
 the concave engaging section of the moving piece having a cylindrical concave-shaped inner-circumferential surface whose inner diameter does not change in an axial direction of the transmission member; the tip-end section of the transmission member having a cylindrical convex-shaped outer-circumferential surface whose outer diameter does not change in the axial direction of the transmission member; the spacer having a cylindrical convex-shaped outer-circumferential surface whose outer diameter does not change in the axial direction of the transmission member and having a cylindrical concave-shaped inner-circumferential surface whose inner diameter does not change in the axial direction of the transmission member.

2. The electric position adjustment apparatus for a steering wheel according to claim 1 further comprising a forward/backward feed screw rod that, with displacement in the axial direction of the column unit prevented, is located parallel with the column unit and is able to rotate freely around a center axis of the forward/backward feed screw rod by way of the electric motor; wherein, the moving piece comprises a base section in which a screw hole is formed that screws onto the screw rod, and a tip-end section in which the concave engaging section is formed, and by rotating the forward/backward feed screw rod in a desired direction, the moving piece moves in an axial direction of the forward/backward feed screw rod.

3. The electric position adjustment apparatus for a steering wheel according to claim 1, wherein the transmission member further comprises an outwardly protruding flange-shaped rim section in a middle section in the axial direction of the transmission member; an inner side spacer that is made of a hard material having an outer diameter that is smaller than an outer diameter of the rim section and that is located on a top surface of the rim section, and an outer side spacer that is made of a material having a vibration absorbing capability with a large internal loss and is located around the inner side spacer, are arranged so that a bottom surface of an inner diameter side portion of the outer side spacer comes in contact with an outer diameter side portion of the top surface of the rim section, and a ring spacer that is made of a hard material and that has a wedge shaped cross-sectional shape is held between top surfaces of the inner side spacer and the outer side spacer and the outer circumferential surface of the adjusted section.

4. The electric position adjustment apparatus for a steering wheel according to claim 1, further comprising an intermediate shaft that is linked with a front-end section of the steering shaft by way of a universal joint such that torque can be transmitted; wherein the steering shaft has integrated construction in which an entire length thereof does not extend or contract; the adjusted section is composed of a steering column having integrated construction in which an entire length thereof does not extend or contract; the intermediate shaft has construction in which an entire length thereof can extend or contract; and by extending or contracting the intermediate shaft, the whole steering shaft and the steering column are able to displace.

5. The electric position adjustment apparatus for a steering wheel according to claim 1 comprising a mechanism provided at at least one location in an axial direction of the support section which is located on an opposite side in a radial direction of the transmission member, and the mechanism presses the adjusted section in a direction toward the transmission member.

6. The electric position adjustment apparatus for a steering wheel according to claim 1, wherein
the adjusted section comprises: a middle cylindrical section that is located in a middle section in an axial direction of the adjusted section, and whose outer diameter does not change in the axial direction of the adjusted section; and reduced-diameter sections that are located on both end sides in the axial direction of the middle cylindrical section and whose outer diameters are smaller than an outer diameter of the middle cylindrical section;
the base-end section of the transmission member is connected and fastened to the middle cylindrical section, and mechanisms are provided at two locations in the axial direction of the support section which is on the opposite side in the radial direction of the transmission member, which press the middle cylindrical section in the direction toward the transmission member, with a space in the axial direction between these mechanisms essentially being equal to the maximum range of movement of the adjusted section in the axial direction of the column unit.

* * * * *